United States Patent
Botman et al.

(10) Patent No.: US 12,493,723 B2
(45) Date of Patent: Dec. 9, 2025

(54) TECHNIQUE FOR HANDLING SEALED CAPABILITIES

(71) Applicant: Arm Limited, Cambridge (GB)

(72) Inventors: François Christopher Jacques Botman, Cambridge (GB); Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 58 days.

(21) Appl. No.: 18/700,886

(22) PCT Filed: Sep. 14, 2022

(86) PCT No.: PCT/GB2022/052321
§ 371 (c)(1),
(2) Date: Apr. 12, 2024

(87) PCT Pub. No.: WO2023/067295
PCT Pub. Date: Apr. 27, 2023

(65) Prior Publication Data
US 2024/0411935 A1  Dec. 12, 2024

(30) Foreign Application Priority Data
Oct. 18, 2021 (GB) ...................... 2114862

(51) Int. Cl.
*G06F 21/64* (2013.01)
*G06F 9/30* (2018.01)
*G06F 21/52* (2013.01)

(52) U.S. Cl.
CPC ............. *G06F 21/64* (2013.01); *G06F 9/30* (2013.01); *G06F 9/3004* (2013.01); *G06F 9/30189* (2013.01); *G06F 21/52* (2013.01)

(58) Field of Classification Search
None
See application file for complete search history.

(56) References Cited

U.S. PATENT DOCUMENTS

| | | | | |
|---|---|---|---|---|
| 6,035,383 A | * | 3/2000 | Seal | G06F 9/3834 |
| | | | | 712/237 |
| 10,901,808 B2 | * | 1/2021 | Duffy | G06F 9/526 |

(Continued)

FOREIGN PATENT DOCUMENTS

| | | | | |
|---|---|---|---|---|
| CN | 107534774 B | * | 11/2020 | ......... H04N 23/6812 |
| CN | 112204535 A | * | 1/2021 | ......... G06F 12/0842 |

(Continued)

OTHER PUBLICATIONS

Robert N. M. Watson; (Cheri: A Hybrid Capability-System Architecture for Scalable Software Compartmentalization); University of Cambridge, London UK; p. 18; Date of Conference: May 17-21, 2015; Date Added to IEEE Xplore: Jul. 20, 2015.*

(Continued)

*Primary Examiner* — Ali H. Cheema
(74) *Attorney, Agent, or Firm* — NIXON & VANDERHYE P.C.

(57) ABSTRACT

An apparatus and method are described for handling sealed capabilities. The apparatus has processing circuitry to perform processing operations during which access requests to memory are generated, wherein the processing circuitry is arranged to generate memory addresses for the access requests using capabilities that identify constraining information. Checking circuitry then determines whether a given access request whose memory address is generated using a given capability is permitted based on the constraining information identified by that given capability, and based on a level of trust associated with the given access request. Each capability has a capability level of trust associated therewith, and the level of trust associated with the given access request is dependent on both a current mode level of trust associated with a current mode of operation of the processing circuitry, and the capability level of trust of the given capability. At least one of the capabilities is settable as (Continued)

a sealed capability, and the apparatus further comprises sealed capability handling circuitry to prevent the processing circuitry performing at least one processing operation using a given sealed capability when the current mode level of trust is a lower level of trust than the capability level of trust of the given sealed capability.

20 Claims, 14 Drawing Sheets

(56) References Cited

U.S. PATENT DOCUMENTS

| | | | | |
|---|---|---|---|---|
| 2006/0031679 | A1* | 2/2006 | Soltis | G06F 21/6281 |
| | | | | 713/182 |
| 2016/0110298 | A1 | 4/2016 | Koufaty et al. | |
| 2018/0349294 | A1* | 12/2018 | Barnes | G06F 12/1441 |
| 2019/0026236 | A1* | 1/2019 | Barnes | G06F 9/3004 |
| 2019/0034664 | A1* | 1/2019 | Barnes | G06F 12/1441 |
| 2019/0095356 | A1* | 3/2019 | Milojicic | G06F 12/023 |
| 2021/0224380 | A1 | 7/2021 | Grocutt | |
| 2021/0294748 | A1* | 9/2021 | Boettcher | G06F 12/1027 |

FOREIGN PATENT DOCUMENTS

| | | | | |
|---|---|---|---|---|
| CN | 112585590 | A * | 3/2021 | G06F 12/1458 |
| GB | 2482700 | A | 2/2012 | |
| TW | 202132975 | A * | 9/2021 | G06F 9/321 |

OTHER PUBLICATIONS

Combined Search and Examination Report for an International Application No. GB2114862.2, dated Jun. 14, 2022.
International Search Report and Written Opinion for an International Application No. PCT/GB2022/052321 dated Nov. 14, 2022.
Bedichek "Some Efficient Architecture Simulation Techniques," Department of Computer Science, University of Washington, Seattle, Washington 98195.

\* cited by examiner

USING SEALED CAPABILITIES

TECHNIQUE FOR HANDLING SEALED CAPABILITIES

CROSS-REFERENCE TO RELATED APPLICATIONS

This application is a 35 U.S.C. 371 National Phase of PCT Application No. PCT/GB2022/052321, filed on Sep. 14, 2022, which claims priority to GB Patent Application No. 2114862.2, filed on Oct. 18, 2021, the disclosures of which are hereby incorporated by reference herein in their entireties.

BACKGROUND

The present technique relates to the field of data processing, and more particularly to the handling of sealed capabilities.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

A number of capability storage elements (for example registers) may be provided for storing capabilities for access by the processing circuitry of a data processing apparatus. Each capability can include constraining information that is used to restrict the operations that can be performed when using that capability. For instance, considering a bounded pointer, this may provide information used to identify a non-extendable range of memory addresses accessible by the processing circuitry when using that capability, along with one or more permission flags identifying associated permissions.

A number of capability architectures have introduced the concept of a sealed capability. By sealing a capability, this allows that capability to be marked as non-dereferenceable (meaning that memory addresses cannot be accessed using the capability) and immutable, causing hardware exceptions to be raised if attempts are made to modify or dereference such a capability. Support for sealed capabilities is desirable, as it allows software use cases such as trusted code to give less trusted code a token to be used during a call back to that trusted code, for example a file handle. This token should not be usable within the less trusted mode, and should not be modified by the software or any other behaviour in the architecture.

However, a multi-bit field (which may be referred to as an "object type" field) typically needs to be provided within capabilities to capture information about the sealed status of a capability, and further it is typically the case that a specific unsealing key, typically a capability with unsealing permissions and a matching object type, needs to be used to unseal such a sealed capability. However, in some modern systems the number of bits available to represent the metadata of a capability is highly constrained, which can render it difficult to support the use of such sealed capabilities. Further, the requirement for needing unsealing keys is cumbersome.

It would hence be desirable to provide an alternative mechanism for supporting the provision of sealed capabilities.

SUMMARY

In a first example arrangement, there is provided an apparatus comprising: processing circuitry to perform processing operations during which access requests to memory are generated, wherein the processing circuitry is arranged to generate memory addresses for the access requests using capabilities that identify constraining information; and checking circuitry to determine whether a given access request whose memory address is generated using a given capability is permitted based on the constraining information identified by that given capability, and based on a level of trust associated with the given access request; wherein: each capability has a capability level of trust associated therewith, and the level of trust associated with the given access request is dependent on both a current mode level of trust associated with a current mode of operation of the processing circuitry, and the capability level of trust of the given capability; at least one of the capabilities is settable as a sealed capability; and the apparatus further comprises sealed capability handling circuitry to prevent the processing circuitry performing at least one processing operation using a given sealed capability when the current mode level of trust is a lower level of trust than the capability level of trust of the given sealed capability.

In a further example arrangement, there is provided a method of handling sealed capabilities, comprising: employing processing circuitry to perform processing operations during which access requests to memory are generated, wherein the processing circuitry generates memory addresses for the access requests using capabilities that identify constraining information; and determining whether a given access request whose memory address is generated using a given capability is permitted based on the constraining information identified by that given capability, and based on a level of trust associated with the given access request; wherein: each capability has a capability level of trust associated therewith, and the level of trust associated with the given access request is dependent on both a current mode level of trust associated with a current mode of operation of the processing circuitry, and the capability level of trust of the given capability; and at least one of the capabilities is settable as a sealed capability; and the method further comprises employing sealed capability handling circuitry to prevent the processing circuitry performing at least one processing operation using a given sealed capability when the current mode level of trust is a lower level of trust than the capability level of trust of the given sealed capability.

In a still further example arrangement, there is provided a computer program for controlling a host data processing apparatus to provide an instruction execution environment, comprising: processing program logic to perform processing operations during which access requests to memory are generated, wherein the processing program logic is arranged to generate memory addresses for the access requests using capabilities that identify constraining information; and checking program logic to determine whether a given access request whose memory address is generated using a given capability is permitted based on the constraining information identified by that given capability, and based on a level of trust associated with the given access request; wherein: each capability has a capability level of trust associated therewith, and the level of trust associated with the given access request is dependent on both a current mode level of trust associated with a current mode of operation of the processing program logic, and the capability level of trust of the given capability; at least one of the capabilities is settable as a sealed capability; and the apparatus further comprises sealed capability handling program logic to prevent the processing program logic performing at least one processing operation using a given sealed capability when the current mode level of trust is a lower level of trust than the capability level of trust of the given sealed capability.

In a yet further example arrangement, there is provided an apparatus comprising: processing means for performing processing operations during which access requests to memory are generated, wherein the processing means is arranged to generate memory addresses for the access requests using capabilities that identify constraining information; and checking means for determining whether a given access request whose memory address is generated using a given capability is permitted based on the constraining information identified by that given capability, and based on a level of trust associated with the given access request; wherein: each capability has a capability level of trust associated therewith, and the level of trust associated with the given access request is dependent on both a current mode level of trust associated with a current mode of operation of the processing means, and the capability level of trust of the given capability; at least one of the capabilities is settable as a sealed capability; and the apparatus further comprises sealed capability handling means for preventing the processing means performing at least one processing operation using a given sealed capability when the current mode level of trust is a lower level of trust than the capability level of trust of the given sealed capability.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
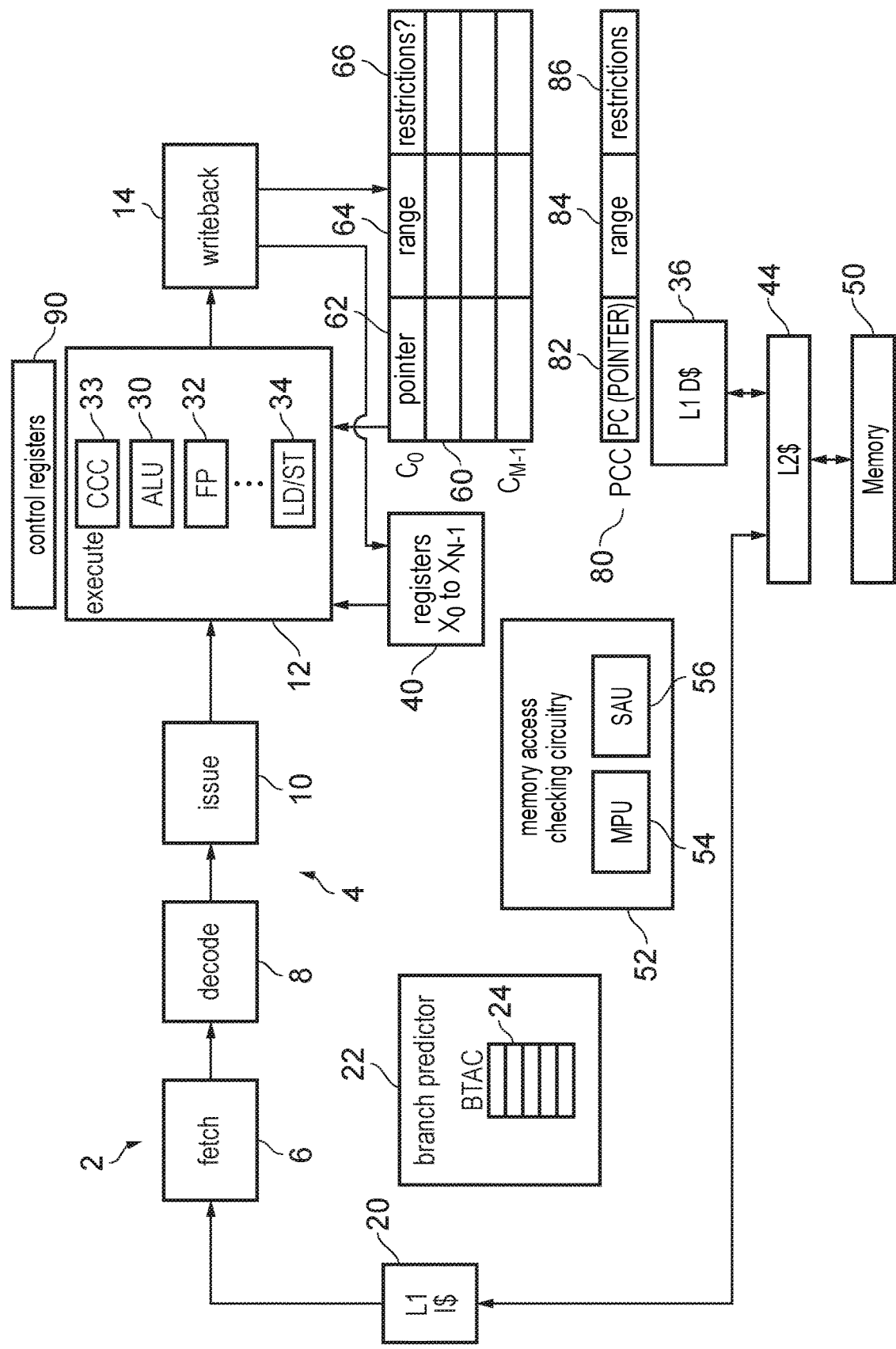
FIG. 1 is a block diagram of an apparatus in accordance with one example implementation.

In accordance with the techniques described herein, an apparatus is provided that has processing circuitry for performing operations during which access requests to memory are generated. The processing circuitry is arranged to generate memory addresses for the access requests using capabilities that identify constraining information. The memory address generated by the processing circuitry may be a virtual address in systems where address translation is performed, or alternatively may be a physical address in systems that do not support address translation.

The apparatus also has checking circuitry to determine whether a given access request whose memory address is generated using a given capability is permitted based on the constraining information identified by that given capability. The functionality of the checking circuitry that performs the above check can be a separate component to the processing circuitry, or alternatively may be provided within the processing circuitry of the apparatus.

There are a number of ways in which the constraining information can be identified by the associated capability. For example, the capability might directly contain the constraining information in one example implementation. However, in an alternative implementation, the capability may instead indicate (directly or indirectly) a location in memory where the constraining information is located.

The checking circuitry is also arranged to further constrain access to the memory by the given access request in dependence on a level of trust associated with the given access request. This functionality of the checking circuitry can be implemented in a variety of ways, for example using a memory management unit (MMU), a memory protection unit (MPU), a security attribute unit (SAU), or a combination of those components. Such checking circuitry would traditionally have been arranged to consider the level of trust associated with the current mode of operation of the processing circuitry when further constraining access to memory, rather than associating any particular level of trust with individual access requests. However, in accordance with the techniques described herein, the given capability has a capability level of trust associated therewith, and that information can also be factored into the checks performed by the checking circuitry. In particular, in accordance with the techniques described herein, the level of trust associated with the given access request is dependent on both a current mode level of trust associated with the current mode of operation of the processing circuitry, and the capability level of trust of the given capability.

By providing a capability level of trust in association with individual capabilities, this can enhance the ways in which capabilities can be managed and used. For example, since as discussed above the capability level of trust will be taken into account by the checking circuitry when determining whether to allow an access to memory specified by a given access request to proceed or not, a mechanism can be provided to allow capabilities to be generated by the processing circuitry in certain circumstances, with the capability level of trust associated with a particular capability effectively being used to then track the provenance of that capability, and to constrain accesses subsequently made using that capability.

In addition, such a mechanism further enables particular use-case protections to be supported, for example to combat a confused deputy attack. A confused deputy attack can occur when less privileged code passes a pointer to more privileged code, seeking to use the more privileged code to perform certain operations on its behalf. Through use of the capability level of trust, this can prevent the more privileged code from accidentally using pointers created by the unprivileged code that maliciously address an area of memory that should not be accessible to the non-privileged code. In particular, in such situations the pointer will have been generated using a capability whose capability level of trust does not exceed that of the unprivileged code, and hence even if the access is attempted from the privileged code the memory accessing circuitry will prevent the access to privileged memory due to the capability level of trust of the capability that was used to generate the pointer.

In accordance with the techniques described herein, the provision of a capability level of trust in association with individual capabilities is also leveraged to provide additional benefits, in particular by providing a lightweight mechanism for handling sealed capabilities that avoids the need to utilise scarce metadata bits to indicate object types and unsealing permissions, and also avoids the need for unsealing keys.

In particular, in accordance with the techniques described herein, the apparatus further comprises sealed capability handling circuitry to prevent the processing circuitry performing at least one processing operation using a given sealed capability when the current mode level of trust is a lower level of trust than the capability level of trust of the given sealed capability. Hence, when considering a sealed capability, the way in which the processing circuitry handles that sealed capability can be constrained taking into account both the current mode level of trust of the processing circuitry and the capability level of trust of the sealed capability in question. In particular, by repurposing the capability level of trust information associated with an individual capability, when a capability is marked as sealed that capability level of trust information can be used to identify a specific software context (software trust level) that is associated with the sealed capability.

The above described techniques can be used in a wide variety of different systems. For instance, the processing circuitry can take a variety of forms. For example, the processing circuitry may be a central processing unit (CPU) that is arranged to execute program code in various different modes of operation, but the techniques can also be applied in relation to other forms of processing circuitry, for example a direct memory access (DMA) controller, an encryption accelerator, etc.

There are a number of ways in which the level of trust associated with the given access request can be determined based on both the current mode of operation of the processing circuitry and the capability level of trust of the given capability. For example, the system could be based on the granting of permissions or the restricting of permissions, and the level of trust associated with the given access request may be dependent on which of those techniques is used. However, in accordance with one example implementation, the technique is based on the restriction of permissions, and the level of trust associated with the given access request is constrained to be whichever of the current mode level of trust and the capability level of trust represents a lower level of trust.

There are a number of ways in which the capability level of trust can be specified for a capability, but in one example implementation the capability level of trust is encoded within the given capability. This can be implemented in a variety of ways, but in one example implementation, for each capability the constraining information provides at least a set of permissions identifying various types of memory accesses permitted to memory addresses generated using that capability, and the capability level of trust is provided as an additional permission.

However, whilst in the example implementation described above the capability level of trust is encoded within the given capability, it should be noted that this is not a requirement, and other mechanisms may be provided for associating a capability level of trust with a given capability. For example, in an alternative implementation the given capability may provide an identifier indicative of a location containing the capability level of trust. Hence, in such an implementation the capability level of trust information can reside elsewhere, for example in memory, with the capability itself containing a value that is indicative of the location of metadata providing the capability level of trust. The identifier used to indicate the location containing the capability level of trust can take a variety of forms. For example it could be an offset from an address stored in a global register of the system, hence enabling a memory address to be determined identifying where in memory the capability level of trust is maintained. Alternatively, the identifier might directly identify the location in memory in which the capability level of trust information is stored.

The constraining information provided within each capability can take a variety of forms, but in one example implementation provides bounds information used to determine an allowable range of memory addresses for the memory address generated for any access request using that capability. In one example implementation, the constraining information can comprise both such bounds information and also a set of permissions identifying types of memory accesses permitted for memory addresses generated using that capability. The capability can also contain other information, for instance a pointer value that is used when generating a memory address, for example by adding that pointer value to some offset in order to generate the memory address. The generated memory address can then be compared against the bounds information to determine whether the generated memory address is within the allowable range.

Returning to the discussion of sealed capabilities, there are a number of ways in which a capability can be identified as being sealed, thus causing the sealed capability handling circuitry to determine how that capability should be handled taking into account both the capability level of trust of the given sealed capability and the current mode level of trust associated with the processing circuitry. However, in one example implementation, each capability has a sealed flag associated therewith, and the sealed capability handling circuitry is responsive to a seal request for a chosen capability to determine whether to set the sealed flag of the chosen capability to identify the chosen capability as a sealed capability, dependent on a comparison of the capability level of trust of the chosen capability with the current mode level of trust.

There are a number of ways in which the sealed flag can indicate the set (i.e. sealed) or clear (i.e. unsealed) state. For example either a logic one value or a logic zero value may be associated with the set state, and indeed in some implementations it may be appropriate to provide a multi-bit encoding. Further, the seal request may occur in a variety of ways, but in one example implementation may for example occur as a result of the processing circuitry executing a seal instruction.

In one example implementation, the sealed capability handling circuitry is arranged, in response to the seal request, to inhibit setting the sealed flag when the capability level of trust of the chosen capability is greater than the current mode level of trust. The actual current mode level of trust required to allow the sealed flag to be set can vary dependent on implementation. For example, the sealing of capabilities may be allowed whenever the current mode level of trust is greater than or equal to the capability level of trust, or alternatively the sealing of capabilities may be restricted solely to cases where the current mode level of trust is the same as the capability level of trust.

In one example implementation, a sealed capability is also allowed to be unsealed in certain situations. For instance, in one example implementation, the sealed capability handling circuitry is responsive to an unseal request for a chosen sealed capability to inhibit clearing of the sealed flag of the chosen sealed capability when the capability level of trust of the chosen sealed capability is greater than the current mode level of trust. As with sealing, the actual current mode level of trust required to allow the sealed flag to be cleared can vary dependent on implementation. For example, the unsealing of capabilities may be allowed whenever the current mode level of trust is greater than or equal to the capability level of trust, or alternatively the unsealing of capabilities may be restricted solely to cases where the current mode level of trust is the same as the capability level of trust.

Further, the unseal request may occur in a variety of ways, but in one example implementation may for example occur as a result of the processing circuitry executing an unseal instruction.

Note that in accordance with the techniques described above, there is no requirement for sealing or unsealing keys to be used, as the decision whether to allow a capability to be sealed, or a sealed capability to be unsealed, is made taking into account both the current mode level of trust and the capability level of trust.

As mentioned earlier, the sealed capability handling circuitry will prevent the processing circuitry performing at least one processing operation using a given sealed capability when the current mode level of trust is a lower level of trust than the capability level of trust of the given sealed capability. The number of processing operations prohibited can be varied dependent on implementation, but in one example the sealed capability handling circuitry is arranged, when the current mode level of trust is a lower level of trust than the capability level of trust of the given sealed capability, to prevent the processing circuitry performing any of a plurality of processing operations using the given sealed capability, but to allow moving of the given sealed capability between storage elements.

It can be useful to allow sealed capabilities to be moved between storage elements, to allow both transfer of such sealed capabilities between registers and memory, and indeed if desired to allow inter-register moves. However, it will typically be the case that the processing circuitry will be prevented from performing most, if not all, processing operations using a sealed capability if the current mode level of trust is lower than the capability level of trust of that sealed capability. Nevertheless, it may still be the case that certain actions are allowed. For example, it may be possible to allow a field (referred to herein as the tag bit) that identifies a capability as being a capability, rather than general purpose data, to be cleared, effectively invalidating the capability, even if the current mode level of trust is less than the capability level of trust of the sealed capability in question.

In one example implementation, the sealed capability handling circuitry is arranged to require the given sealed capability to be unsealed before that capability is allowed to be used by the processing circuitry in subsequent processing operations, irrespective of the current mode level of trust.

However, in an alternative implementation, the sealed capability handling circuitry may be arranged, at least when the current mode level of trust is the same as the capability level of trust of the given sealed capability, to allow the processing circuitry to perform one or more processing operations using the given sealed capability without unsealing the given sealed capability. This functionality could for example be restricted to situations where the current mode level of trust is the same as the capability level of trust, or alternatively may be allowed in situations where the current mode level of trust is greater than or equal to the capability level of trust.

The one or more processing operations that are allowed to be performed using a given sealed capability in the circumstances identified above can be varied dependent on implementation. For example, a de-referencing operation may be allowed in order to generate a memory address using the given sealed capability. Instead, or in addition, a capability modifying operation may also be allowed in order to modify the information identified by the given sealed capability. Any of the information and associated metadata of the capability may be changed (sometimes referred to as being mutated, particularly when the metadata is being altered) when performing such modifying operations, but typically such operations will be constrained so as not to reduce the constraints specified by the capability. For example, it will typically be the case that any changes to range information or permissions will only be allowed if they serve to reduce the range, or reduce permissions.

The processing circuitry can be arranged to operate in a variety of different ways, with the current mode level of trust being dependent on how the processing circuitry is currently operating. For example, in one implementation the processing circuitry may be arranged to execute program code in one of a plurality of states comprising at least a privileged state and an unprivileged state, and the current mode level of trust may be dependent on which of the plurality of states the current program code is executed in. It should be noted that there may be two different states, namely the privileged state and the unprivileged state, or there could be N different states having different levels of privilege, where N is greater than 2, and in either of these scenarios the current mode level of trust can be set dependent on which state the current program code is executed in. For example, a specific implementation may provide, as the different states, different exception levels (ELs) such as EL0, EL1 and EL2, where EL2 is more privileged than EL1, and EL1 is more privileged than EL0.

Alternatively, or in addition, the processing circuitry may be arranged to execute program code in one of a plurality of security domains comprising at least a secure domain and a less secure domain, and the current mode level of trust may be dependent on which of the plurality of security domains the current program code is executed in. As with the processing states, there may be just two domains, namely a secure domain and a non-secure domain, or alternatively there may be M different domains, where M is greater than 2, each of the domains having a different level of security, and the current mode level of trust can then be set dependent on which of the security domains the current program code is executed in.

It should also be noted that the current mode level of trust can be set dependent on multiple different orthogonal levels of trust, and there may be more than two orthogonal levels of trust. Hence, for example, in one implementation the processing circuitry may be able to operate in both the different states and the different security domains discussed above, and the current mode level of trust can be set dependent on both of those factors.

The capabilities can be stored in a variety of locations within the system. For example, the apparatus may have a set of capability registers that are used to store capabilities for reference by the processing circuitry, but may also have memory circuitry that can be used to store one or more capabilities. The processing circuitry may be arranged to perform a load operation in order to load a chosen capability from the memory circuitry into a selected capability register from the set of capability registers. During this process, the processing circuitry may be arranged to selectively modify the capability level of trust such that the chosen capability as stored into the selected capability register has a capability level of trust constrained not to exceed the current mode level of trust or the capability level of trust of the chosen capability as stored in the memory circuitry. Hence, whilst the original version of the capability that may still be retained within the memory circuitry will not have its associated capability level of trust altered, the version as stored into the capability register can have its capability level of trust altered by the processing circuitry during the load operation, so as to constrain that capability level of trust, and hence constrain subsequent memory access operations performed using that loaded capability in dependence on the capability level of trust of that capability as stored within the capability register.

Whilst such selective demotion of the capability level of trust may be appropriate for standard capabilities, such an action needs to be suppressed in relation to sealed capabilities, as it is a requirement that sealed capabilities are not modified. Hence, in one example implementation the processing circuitry is further arranged, when the chosen capability is a sealed capability, to inhibit modification of the capability level of trust during such a load operation. In the case of a sealed capability, there is no security issue resulting from allowing less trusted code to be provided with a more trusted sealed capability, since the earlier identified actions of the sealed capability handling circuitry will prevent that less trusted code from using the more trusted sealed capability.

In some implementations the load operation may be performed in some instances to load ordinary data (rather than a capability) into a capability register, and in such instances it may be important that the bits in the data that would be associated with the capability level of trust were that data in fact a capability are not modified, since in this case it is not a capability that is being handled and modifying those bits would corrupt the data. Accordingly, in one example implementation the processing circuitry may be arranged to only selectively modify the capability level of trust during the load operation when the chosen capability has a control value identifying that the chosen capability is a valid capability (and the capability is not a sealed capability). By such an approach, the above described selective modification of the capability level of trust during the load operation will only be performed if in fact a non-sealed capability is being loaded into the capability register.

In one example implementation, the sealed capability handling circuitry is arranged to generate outcome information indicative of an outcome of processing an unseal request for the chosen sealed capability. The outcome information can take a variety of forms, but generally will be sufficient to enable a determination to be made as to whether or not the capability has been successfully unsealed. For example, in the event of unsealing not being successful, a fault could be raised. Alternatively, one or more status flags could be set in order to indicate the failure to software. As another example, an indication could be returned to software to identify that a capability has been successfully unsealed, and if desired an indication could also be provided to identify situations where the capability that has been successfully unsealed has a capability level of trust that exactly matches the current mode level of trust. As another example, an unsealing operation that is unsuccessful may be allowed to silently fail, with the lack of information being generated to indicate successful unsealing being used to later determine that the unsealing operation failed.

If desired, outcome information could also be generated to identify the outcome of processing a seal request, for example to identify whether the seal operation has been successful or unsuccessful. In one example implementation, success could be assumed, and information may only be output if the sealing operation was unsuccessful. In a yet further example implementation, no information may be generated irrespective of whether the seal request is successful or unsuccessful, and an unsuccessful sealing operation can be detected at a later stage, for example during unsealing.

In some example implementations there may be some capabilities that are of a reserved type, and which for example are used by the architecture to indicate specific events or functions. In one example implementation, the sealed capability handling circuitry may be arranged to inhibit unsealing of such capabilities irrespective of the current mode level of trust. If desired, an attempt to unseal such a capability could result in an error being asserted, the tag bit being cleared to effectively invalidate the capability, or some other indication being provided to software. There are a number of ways in which such reserved type capabilities may be identified. As a particular example, they may have range bounds information that defines an invalid range, for example by the upper bound being below the lower bound.

Particular examples will now be described with reference to the figures.

The techniques described herein can be employed in a variety of data processing systems, and in association with different types of processing circuitry within such systems. For example the techniques can be used in association with processing circuitry taking the form of a central processing unit (CPU), but could alternatively be employed in association with other processing circuitry, such as a direct memory access (DMA) controller, an encryption accelerator, etc. Purely by way of illustrative example in the following FIG.

1, a processing pipeline of a CPU will be considered as an example of processing circuitry within which the described techniques can be used.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some example implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (pops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some example implementations may support in-order processing so that instructions are issued for execution in an order corresponding to the program order in which instructions were fetched from the L1 instruction cache 20. Other example implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer (TLB) may be provided (for example within memory access checking circuitry 52 to be described in more detail later) for translating the virtual addresses used by the pipeline 4 into physical addresses used for accessing the cache or memory. For example, the TLB may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some example implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While a single level TLB may be used, it will be appreciated that a hierarchy of TLBs may instead be provided so that a level one (L1) TLB may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in an alternative example implementation the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an example implementation where the same physical storage is used for both general purpose data registers and bounded pointer registers, then in one example implementation the pointer value 62 may for example be stored within the same storage location as used for a corresponding general purpose register.

Figure 2:
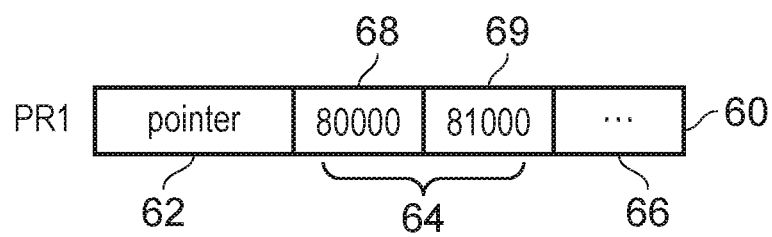
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
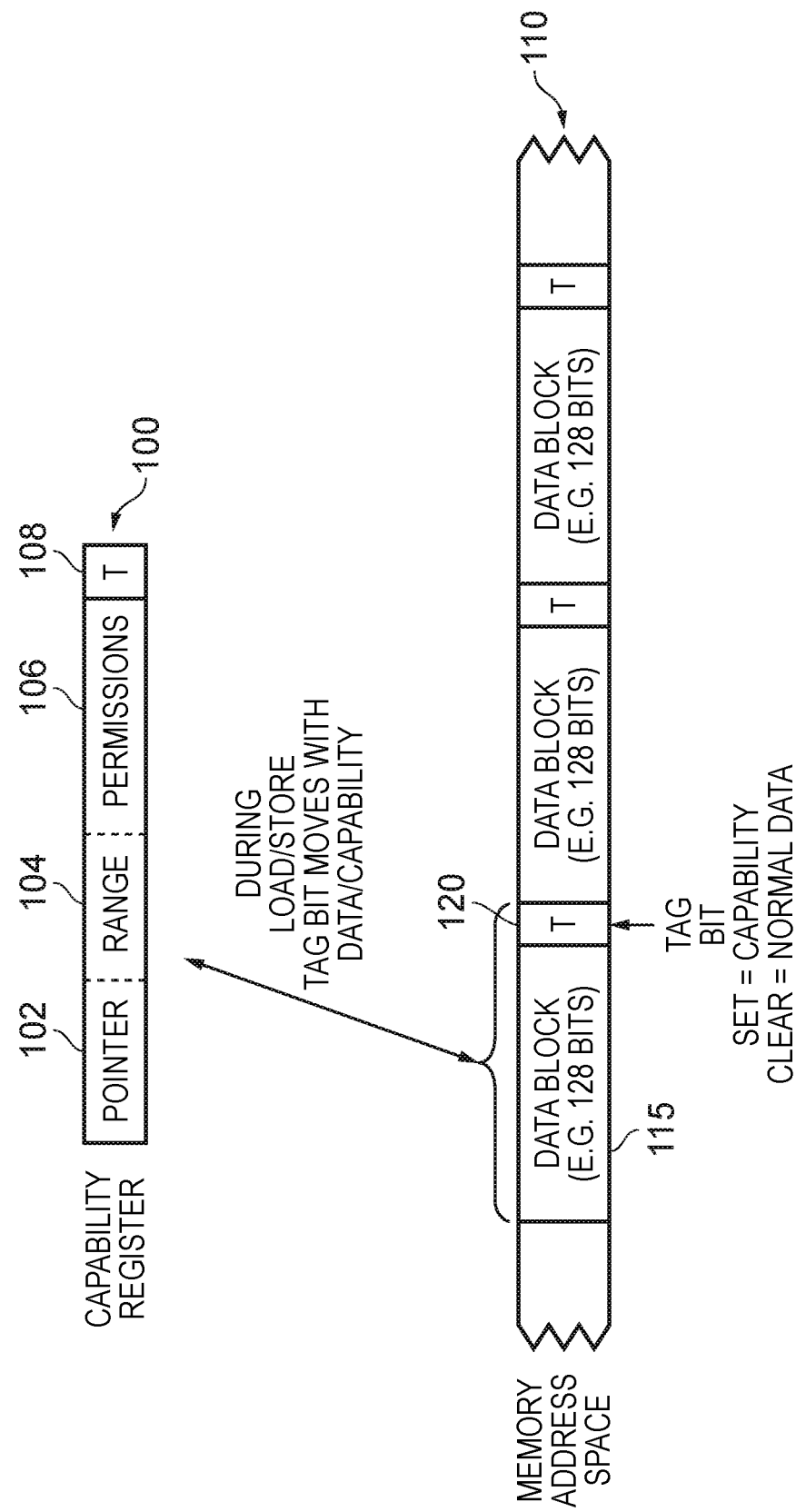
FIG. 3 illustrates the use of a tag bit in association with bounded pointers, in accordance with one example implementation.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits, but in other example implementations different sized data blocks may be used, for example 64-bit data blocks when capabilities are defined by 64 bits of information. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on example implementation, but purely by way of illustration, in one example implementation if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Returning to FIG. 1, the apparatus 2 may be provided with capability checking circuitry 33 that can perform a capability check operation in association with a given access request whose memory address is generated using a given capability, in order to determine whether that access request is permitted based on the constraining information identified by the capability. This can for example be performed with reference to the range information and restriction/permission information discussed earlier, which collectively may be referred to as the constraining information of the capability. Hence, purely by way of example, if a write access request to a memory address is seeking to be performed using a capability that indicates that the capability can only be used for reads but not writes, then the capability checking circuitry 33 may determine that the access request cannot proceed, and may for example issue a fault signal under such circumstances.

However, assuming the capability check operation is passed, then the memory access request may be propagated on to memory access checking circuitry 52 which can provide some further checks to ensure that the access is allowed to proceed. For example, the processing circuitry may be able to operate in multiple different modes of operation, and each mode of operation may for example be associated with a certain state of privilege, and/or with a particular security domain in which the apparatus is operating, and certain regions of memory may only be accessible when the processing circuitry is operating in one or a subset of the possible modes of operation.

The memory access checking circuitry 52 can hence check whether accesses to the memory system are permitted based on attribute data specified for various regions of a memory address space. The memory access checking circuitry may include a security attribute unit (SAU) 56 for storing security domain defining data which defines a security domain associated with each respective region of the memory address space. Based on the security attribute data, the security attribute unit 56 may check whether a memory access is allowed depending on a current security domain of operation of the processing circuitry and on the security domain associated with the region including the target address and the memory access. In other implementations the SAU 56 may not directly store the security domain defining data, but instead may access security defining data stored elsewhere in order to perform the memory access checks. In some systems the security domain defining data may be stored in the memory system 50, or may be stored in configuration registers elsewhere in the system 2.

The processing circuitry 4 may operate in a current security domain of operation, which may generally correspond to the security domain associated with the address of the instruction currently being executed (although there may be some exceptions, e.g. when handling transitions between domain). Whilst operating in a secure domain, the processing circuitry may have access to data in memory regions associated with both the secure domain and a less secure domain, whilst when operating in a less secure domain the processing circuitry may have access to the data in regions associated with the less secure domain but may not be permitted to access data in regions of the address space which the SAU 56 specifies as being associated with the secure domain. This enables protection of sensitive data against unauthorised access from code operating in the less secure domain. As will be discussed in more detail herein, when the SAU 56 is performing such checks to determine whether an access can proceed, it considers not only the current security domain of the processing circuitry, but finer grained information associated with the individual access request being considered. This finer grained information is based both on the security domain of the processing circuitry, and a level of trust indication associated with the capability that is used to generate the memory address of the access request.

As also shown in FIG. 1, the memory access checking circuitry 52 may include a memory protection unit (MPU) 54 which checks whether memory accesses to the memory system 50 satisfy access permissions which may specify, for example, which privilege levels of the processing circuitry 4 are allowed to access a given region of memory, or may specify whether a memory region of the address space can be accessed by both read and write operations or is a read only region for which writes are prohibited. The access permissions used by the MPU 54 may for example be specified by a more privileged process (such as a hypervisor or an operating system) to control which regions of memory a less privileged process (such as an application) is allowed to access, and how (read only or read/write). The permissions provided by the MPU 54 may be orthogonal to those provided by the SAU 56, so that for a given memory access request to be allowed, it should pass the checks based on the access permissions defined for both the MPU 54 and the SAU 56. Although the MPU 54 is shown as a single entity in FIG. 1, in some examples separate secure and less secure MPUs may be provided, each associated with one of the security domains, so that different memory access permissions can be specified for a given region of memory depending on whether the current domain is the secure domain or the less secure domain (e.g. a region could be read only in the less secure domain but both readable and writeable in the secure domain).

As with the earlier discussion of the SAU, when the MPU is performing its access permission checks, it can take into account a level of trust associated with the given access request, which is dependent not only on the current mode of operation of the processing circuitry, but also a capability level of trust associated with the capability that is used to generate the memory address.

One or more control registers 90 may be provided to store enable/disable flags for certain features provided by the implementation described herein. By way of specific example, it may be possible for immutable capabilities having a lower level of trust than the level of trust of the current mode of operation of the processing circuitry to selectively be modified, but this behaviour can be controlled by a separate bit within the control registers 90. Similarly, a fault may be raised when seeking to dereference a capability with a higher level of trust associated therewith from within a less privileged mode of operation of the processing circuitry, and again such functionality could possibility be gated by an enable control bit within the control registers 90. As will also be discussed later, capabilities may be loaded from memory into capability registers, and during this process the associated level of trust of the capability being loaded may selectively be demoted, but again such functionality could be controlled by a separate control bit in the control registers 90.

Figure 4:
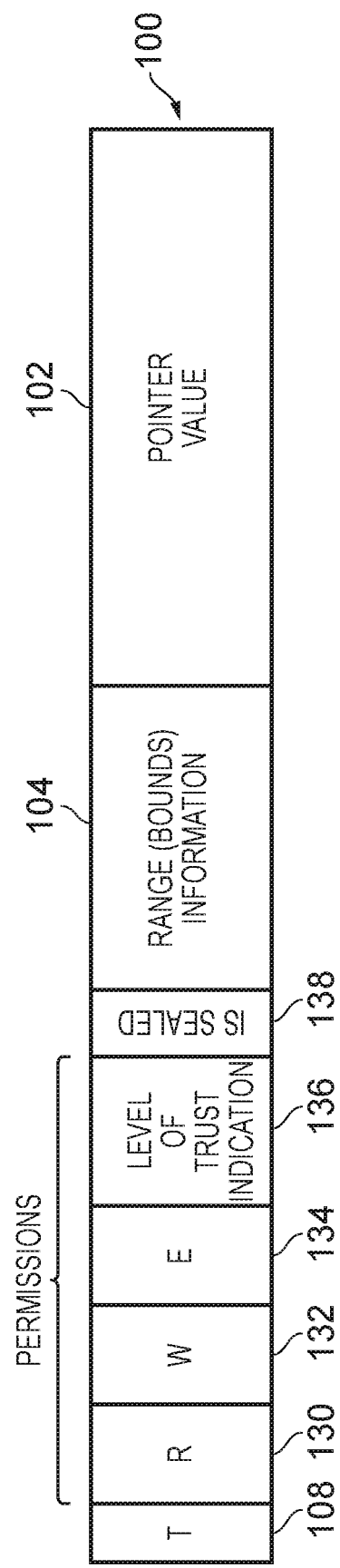
FIG. 4 schematically illustrates the form of a capability that may be used in accordance with the techniques described herein, where a level of trust indication is provided in association with the capability, and a sealed flag is provided for indicating whether a capability is sealed or not.

In accordance with the techniques described herein, capabilities are provided with associated capability level of trust information, and that level of trust indication can be factored into the memory access checking procedures implemented by the memory access checking circuitry 52. There are various ways in which this level of trust indication may be provided in association with a capability, but FIG. 4 illustrates one example implementation. In the example shown in FIG. 4, the capability 100 contains a pointer value 102 and some range information 104 (also referred to herein as bounds information). A set of permissions can also be provided within the capability, along with the earlier-described tag bit 108 which can be set or cleared to identify whether the corresponding block of data is to be treated as a capability or not.

Permissions specified for the capability can vary dependent on implementation, but in one example implementation the permissions include a read permission bit 130 whose value indicates whether the capability can be used to generate memory addresses for read accesses, a write permission bit 132 whose value indicates whether the capability can be used to generate memory addresses for write accesses, and an execute permission bit 134 whose value indicates whether the capability can be used to generate memory addresses of instructions to be fetch and executed. Other information can be identified within the capability, for example to indicate whether the capability is considered immutable or not. Whilst such information can be directly specified as extra information in the capability, it can in some example implementations be inferred from the state of other information already provided within the capability. For example, in one particular implementation, when the execute bit is set, the capability is considered to be immutable, in that the information specified by the capability cannot be modified without clearing the tag bit (effectively invalidating the capability), except through the normal incrementing of pointer values that may result from instruction execution.

As shown in FIG. 4, in one example implementation the permissions fields are extended to provide a level of trust indication field 136, the level of trust indication identifying a level of trust associated with the capability 100. The level of trust can be directly encoded into the field 136 of the capability 100, or alternatively the level of trust indication field 136 can provide an identifier that is used to indicate a memory address containing the level of trust information. Such an identifier could directly indicate the memory location of the level of trust information, or it could for example specify an offset that can be applied to an address stored in a global register in the system in order to identify the location containing the level of trust information.

Figure 5A:
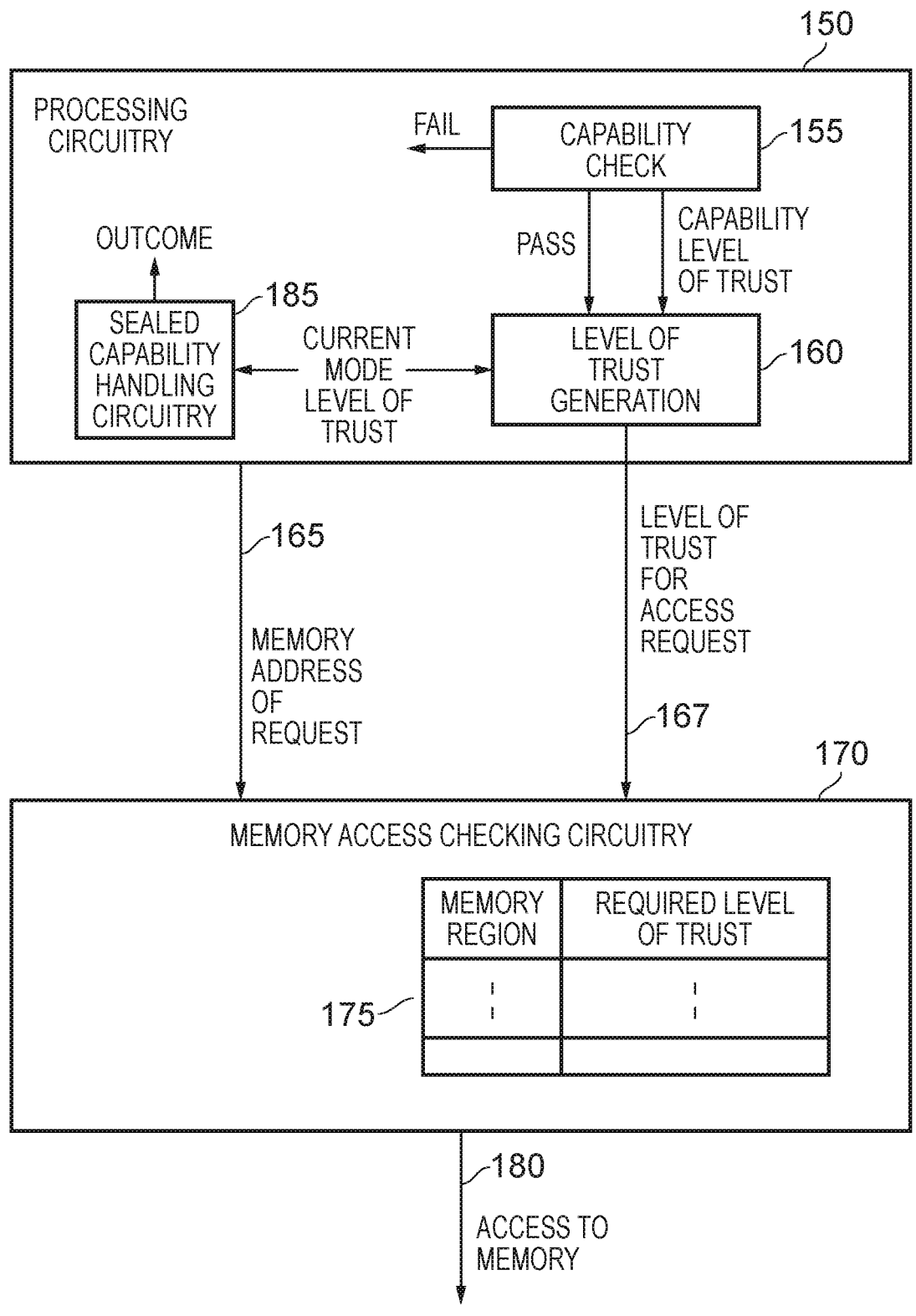
FIG. 5A is a diagram schematically illustrating how a level of trust for an individual access request may be generated and thereafter used to constrain access to memory, in accordance with one example implementation, whilst also supporting appropriate handling of sealed capabilities.

FIG. 5A is a block diagram schematically illustrating how the capability level of trust information is used to constrain accesses to memory, in accordance with one example implementation. In this example, the processing circuitry 150 includes a capability checking block 155 that can be used, when an access request is being considered whose memory address is generated using a given capability, to perform a capability check operation to determine whether that access request is permitted based on the constraining information identified by the given capability. Hence, the capability check may involve reference to the range and permission information of the capability in order to determine whether the access is allowed to proceed or not. In the event of a fail of the capability check, a failure indication can be provided to the processing circuitry, and this can take a variety of forms, for example a fault signal. However, if the capability check is passed, then this is indicated to a level of trust generation block 160, which also receives the capability level of trust information 136 of the capability 100.

In addition to the capability level of trust, the level of trust generation block 160 also receives an indication of the current mode level of trust, this being the level of trust associated with the current mode of operation of the processing circuitry. Both the capability level of trust and the current mode level of trust are then used in combination to form a level of trust for the access request, which is propagated over path 167 in association with the memory address of the request issued over path 165. There are various ways in which the level of trust generation block 160 can use both the current mode level of trust and the capability level of trust to decide on the level of trust for the access request, but in one example implementation the level of trust associated with the access request is constrained to be whichever of the current mode level of trust and the capability level of trust represents a lower level of trust.

The memory access checking circuitry 170 receives both the memory address of the request and the associated level of trust for the access request, and can perform a memory access checking operation with reference to stored access permission information 175 which can be specified for different memory regions. In particular, for each of a number of different memory regions, the access permission information can effectively indicate the required level of trust that needs to be provided for the access request in order to enable the access to proceed. If the level of trust for the access request received over path 167 does not meet the required level of trust, then the access can be caused to fail, whereas otherwise the access to memory can be propagated over path 180 from the memory access checking circuitry 170.

As discussed earlier, in accordance with the techniques described herein, the provision of a capability level of trust in association with individual capabilities is also leveraged to provide a lightweight mechanism for handling sealed capabilities that avoids the need to utilise scarce metadata bits to indicate object types and unsealing permissions, and also avoids the need for unsealing keys.

In particular, in accordance with the techniques described herein, a sealed flag field 138 is added to capabilities to identify whether the associated capability is sealed or unsealed, this sealed flag field 138 being illustrated in FIG. 4 (it may also be referred to herein as the IsSealed flag). In one implementation this could be a single bit with one state (e.g. a logic one value) indicating that the capability is sealed, and the other state (e.g. a logic zero value) indicating that the capability is unsealed. However, there is no requirement for the sealed flag to be a single bit value, and in some implementations a multi-bit value may be used to capture some additional information.

Further, as shown in FIG. 5A, sealed capability handling circuitry 185 is used to determine how to handle sealed capabilities. The sealed capability handling circuitry 185 may be provided as a separate component, or may be incorporated within the processing circuitry 150 as shown in FIG. 5A. When handling sealed capabilities, the sealed capability handling circuitry 185 does not need to use sealing keys or unsealing keys, but instead is able to make reference to the capability level of trust information captured in association with a given capability in order to assess, in combination with a current mode level of trust associated with the processing circuitry 150, how that given capability should be handled. Based on this information, the sealed capability handling circuitry 185 can, for example, determine whether a given capability can be sealed, in which event all that is required is for the sealed capability handling circuitry to cause the sealed flag to be set, determine whether a given sealed capability can be unsealed, in which event all that is required is for the sealed capability handling circuitry to cause the sealed flag to be cleared, and determine how sealed capability can be used by the processing circuitry, dependent on a comparison of the capability level of trust of the sealed capability and the current mode level of trust of the processing circuitry.

Figure 5B:
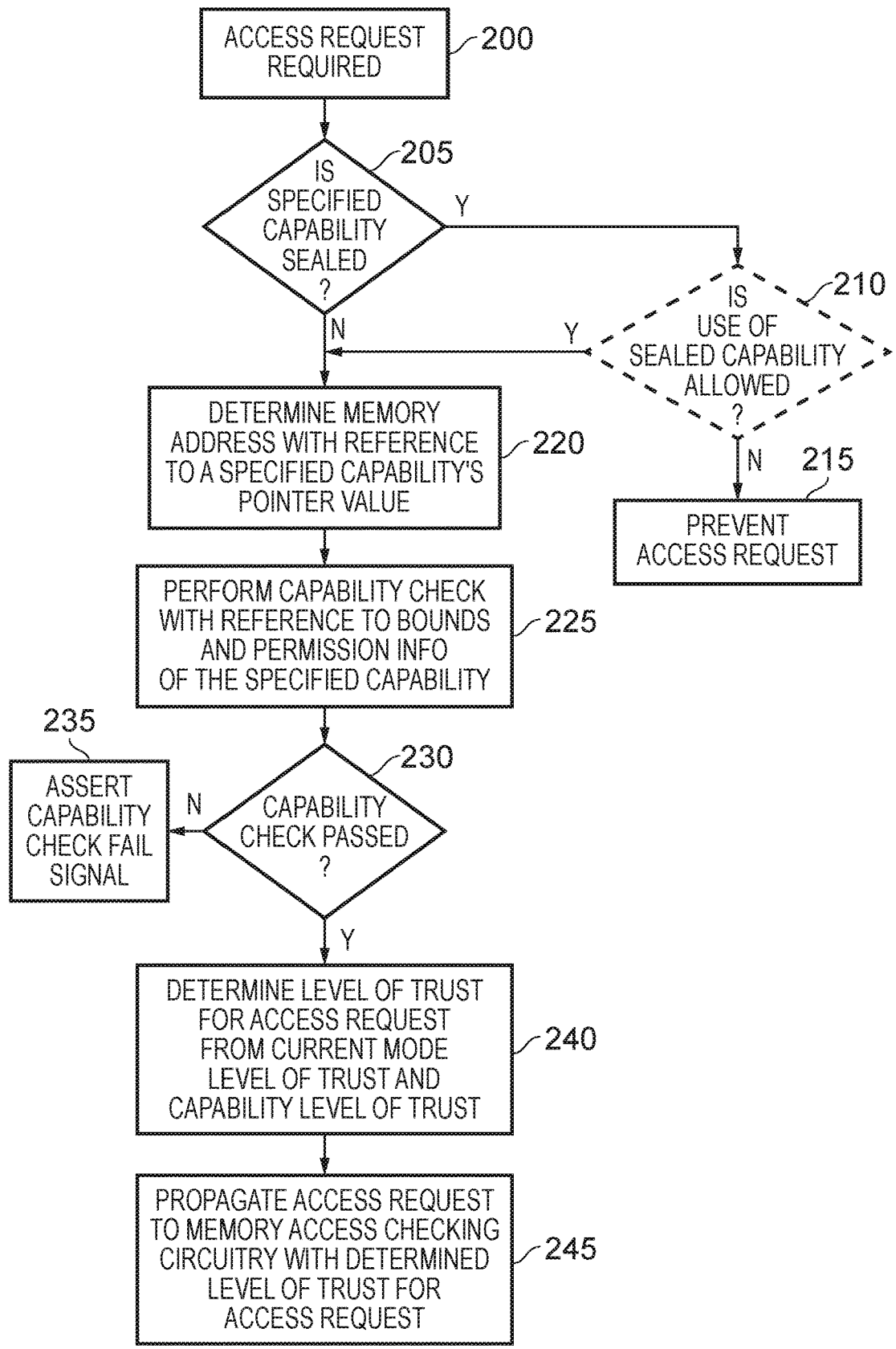
FIG. 5B is a flow diagram illustrating the operation of the apparatus schematically shown in FIG. 5A, in accordance with one example implementation.

FIG. 5B is a flow diagram illustrating the operation of the circuitry of FIG. 5A in one example implementation. At step 200 it is determined that an access request is required. Thereafter, at step 205, it is determined whether the capability specified for the access request is a sealed capability or not. If so, it may then be determined at step 210 whether the use of a sealed capability is allowed. In some implementations, it may always be the case that a sealed capability cannot be dereferenced in order to generate a memory address (instead it being necessary for any such sealed capability to be unsealed first), and in that event the process could proceed directly to step 215 without needing to perform the check of step 210, whereby the access request would be prevented. However, in some implementations, provision may be provided for a sealed capability to be used without needing to be unsealed first, depending on the relative level of trust of the current mode of the processing circuitry and the capability level of trust of the specified capability. For example, in one implementation, if the current mode level of trust is greater than or equal to the capability level of trust, then the use of the sealed capability may be allowed.

Hence, if at step 210 it is determined that use of the sealed capability is allowed, the process proceeds to step 220, and indeed also proceeds to step 220 if at the earlier step 205 it is determined that the specified capability is not a sealed capability. However, if at step 210 it is determined that the use of the sealed capability is not allowed, then the process proceeds to step 215 where the access request is prevented from taking place. There are a number of ways in which the access request could be prevented. For example, a capability check fail signal could be asserted, or some other action could be taken to identify that an access request has been attempted using a sealed capability.

Assuming the process does proceed to step 220, then at that step the memory address for the access request is determined with reference to the specified capability's pointer value. At step 225 a capability check is then performed with reference to the bounds and permission information of the specified capability in order to determine whether the access can proceed.

Accordingly, at step 230 it is determined whether the capability check has been passed or not, and if not the process proceeds to step 235 where a capability check fail signal is asserted. Step 235 can be implemented in the same way as step 215 in one example implementation.

Typically when performing the capability check at step 225 the level of trust information is not used, but instead is retained for passing on to the memory access checking circuitry 170. However, in certain implementations the level of trust information can also be used during the capability checking process. For example, the processing circuitry may be arranged to issue a fault signal at step 235 when an attempt is made to perform an access identified by a given access request in a situation where the capability level of trust associated with the capability being used to generate the memory address for that access request exceeds the current mode level of trust associated with the current mode of operation of the processing circuitry. In particular, in some implementations it may be considered incorrect behaviour for the processing circuitry operating at a certain level of trust to seek to make use of a capability that has a higher capability level of trust.

If the capability check is determined to have been passed at step 230, then at step 240 the level of trust for the access request is determined by the level of trust generation block 160 based on both the current mode level of trust and the capability level of trust. Thereafter, at step 245 the access request is propagated to the memory access checking circuitry 170 with the determined level of trust for the access request, so that the memory access checking circuitry 170 can then perform access permission checks based on that indicated level of trust for the access request.

Figure 6:
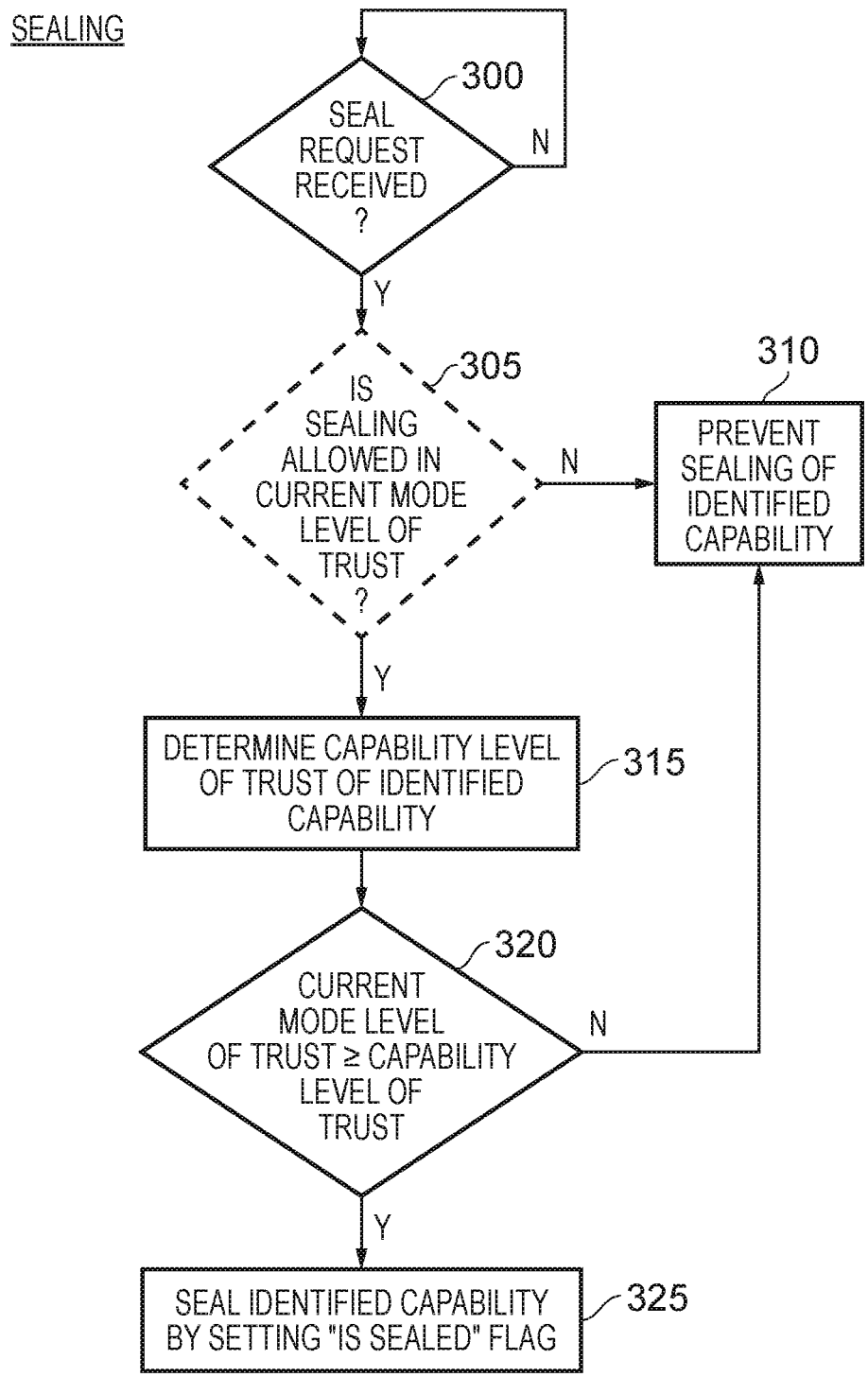
FIG. 6 is a flow diagram illustrating the handling of a seal request in accordance with one example implementation.

FIG. 6 is a flow diagram illustrating steps performed when processing a seal request in accordance with one example implementation. The seal request may be generated in a variety of ways, but in one example implementation may occur as a result of the processing circuitry executing a seal instruction. At step 300, it is determined whether a seal request has been received, and if so then, as an optional step, it may be determined at step 305 whether sealing is allowed in the current mode level of trust. In some implementations, such a check may be considered unnecessary, since the implementation may in principle allow sealing in any current mode level of trust, subject to the further checks described below. However, in an alternative implementation, sealing could be limited to certain operating modes, and in that event the check at step 305 could be performed.

If it is determined that sealing is not allowed in the current mode level of trust, then at step 310 sealing of the identified capability is prevented. At step 310, the apparatus may further output information to identify the failure of the sealing process, for example by asserting a fail signal, or by updating certain status flags. However, in an alternative implementation, it may be considered unnecessary to output any indication of success or failure of the sealing process, since the failure to seal can be arranged to be picked up at a later stage, for example during a subsequent unsealing process.

If at step 305 it is determined that sealing is allowed in the current mode level of trust, or whenever a seal request is received at step 300 in the event that the optional step 305 is not performed, then the process proceeds to step 315, where the capability level of trust of the identified capability is determined. As discussed earlier with reference to FIG. 4, this information may for example be directly available in the capability, in particular in the level of trust indication field 136.

At step 320, the sealed capability handling circuitry 185 then determines whether the current mode level of trust of the processing circuitry is greater than or equal to the capability level of trust of the identified capability. If not, then the process proceeds to step 310 where sealing of the identified capability is prevented.

However, assuming the current mode level of trust is greater than or equal to the capability level of trust, then the process proceeds to step 325 where the identified capability is sealed by setting the sealed flag 138. In much the same way as discussed earlier with reference to step 310, if desired the apparatus may be arranged to output information to indicate successful sealing of the capability. However, in one example implementation successful sealing is assumed, and accordingly no information is output. In the event that the sealing was unsuccessful, this may either be indicated by information output at step 310 or, as mentioned earlier, can be picked up at a later stage, for example during unsealing of the capability.

Figure 7:
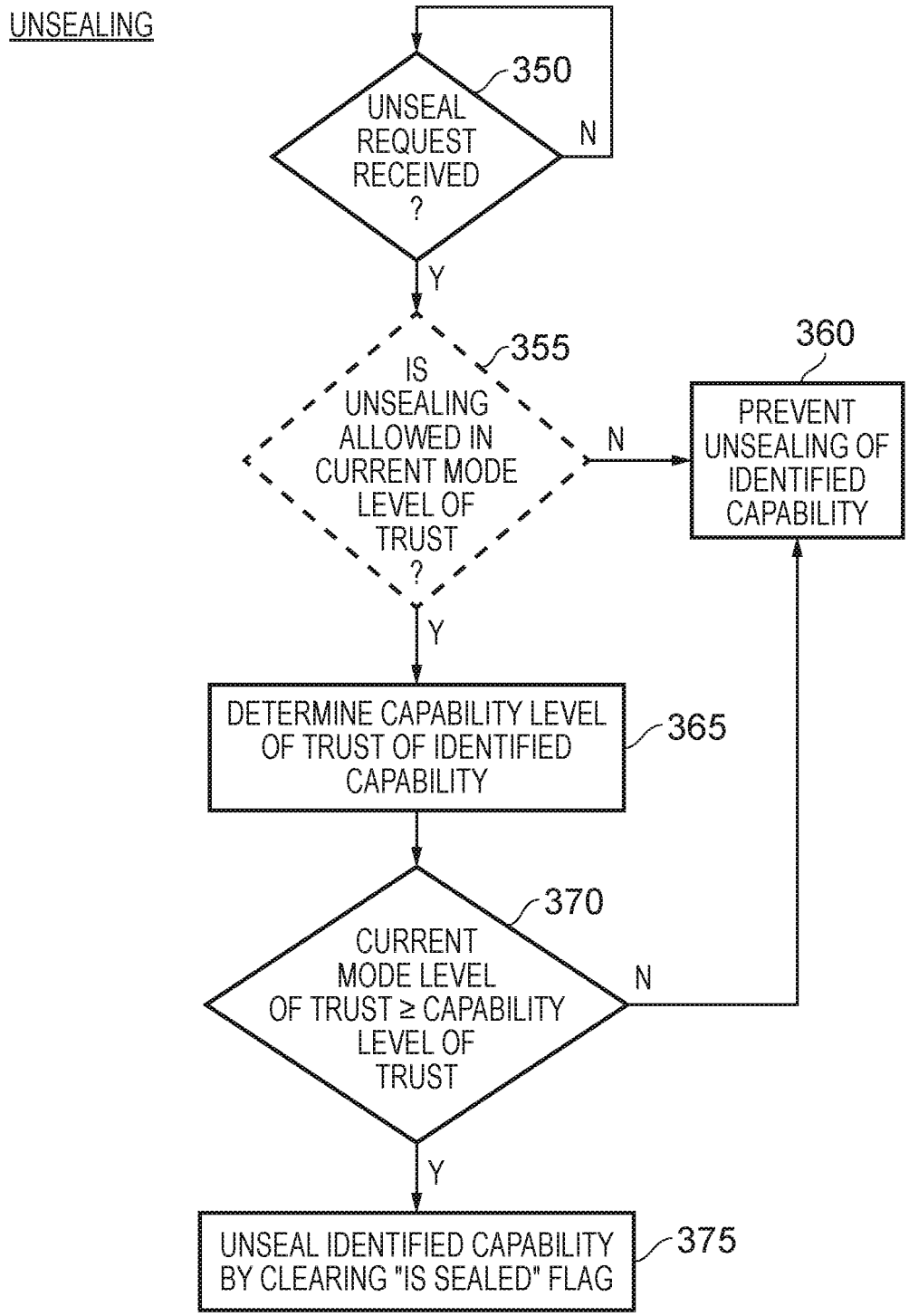
FIG. 7 is a flow diagram illustrating the handling of an unseal request in accordance with one example implementation.

FIG. 7 is a flow diagram illustrating the steps performed in response to an unseal request being received. When such a request is received at step 350, then as an optional step 355, it can be determined whether unsealing is allowed in the current mode level of trust. As discussed earlier with respect to the equivalent step 305 in the sealing process of FIG. 6, if desired, the ability to unseal could be limited to particular operating modes. However, in one example implementation, no such generic limitation is imposed, and accordingly step 355 is not needed.

If step 355 is implemented, and it is determined that unsealing is not allowed in the current mode level of trust, then at step 360 the identified capability is prevented from being unsealed. Information may be output at this point to identify that unsealing has been unsuccessful. For example, a fault signal could be raised, or alternatively one or more status flags could be set in order to indicate the failure to software. As another example, an unsealing operation that is unsuccessful may be allowed to silently fail, with the lack of information being generated to indicate successful unsealing being used to later determine that the unsealing operation failed.

If at step 355 it is determined that unsealing is allowed in the current mode level of trust, or directly responsive to an unseal request at step 350 if step 355 is not required, the process proceeds to step 365 where the capability level of trust of the identified capability is determined with reference to the level of trust indication field 136.

It is then determined at step 370 whether the current mode level of trust is greater than or equal to the capability level of trust, and if not unsealing of the identified capability is prevented at step 360.

However, assuming the current mode level of trust is greater than or equal to the capability level of trust, then at step 375 the identified capability is unsealed by clearing the sealed flag. If desired, information may be output at this point to indicate the successful unsealing of the capability. In one particular implementation, two output signals are generated at this point. The first signal is used to identify that the capability was sealed and successfully unsealed, whilst the second signal can identify whether the capability was sealed and unsealed from the same mode level of trust of the processing circuitry. Hence the second signal can be used to indicate that the capability was associated with the current mode level of trust, which can be useful to software in some implementations, for example to ensure that the capability was generated by the same context as that trying to reference it.

Figure 8:
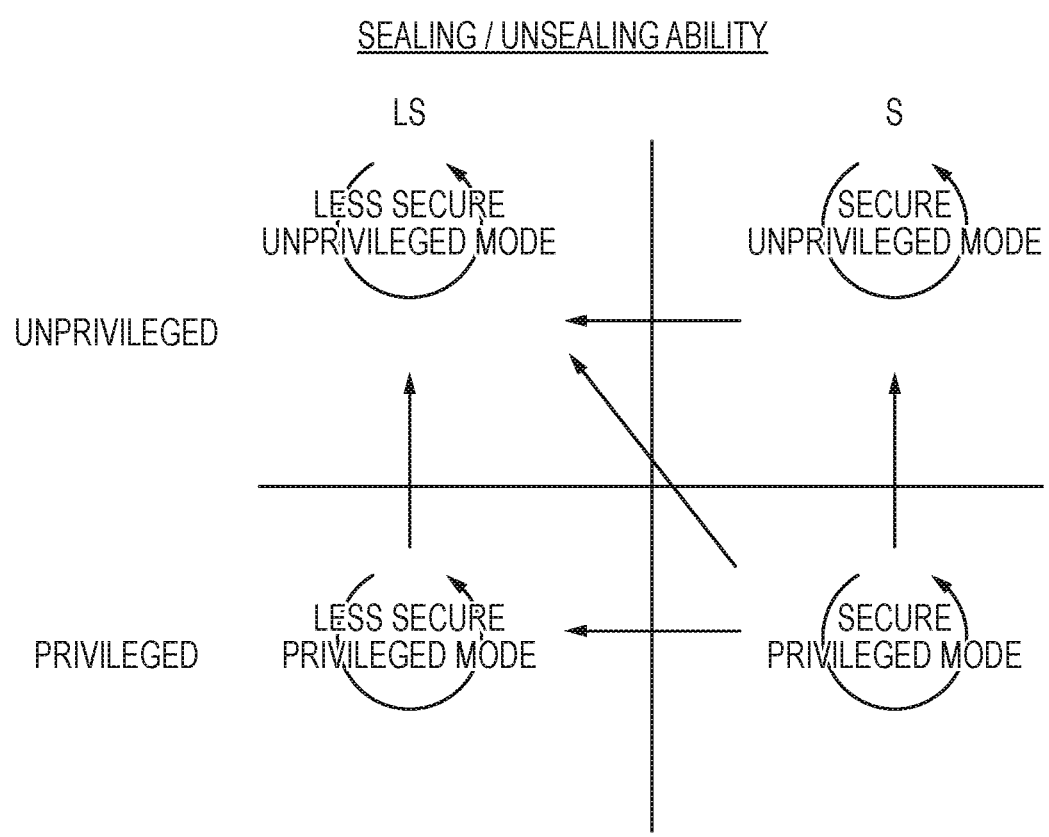
FIG. 8 shows an example of different domains and processing states of the processing circuitry, in accordance with one example implementation, and schematically indicates the sealing and unsealing abilities that may be supported when the processing circuitry is operating in particular combinations of domain and processing state.

FIG. 8 is a diagram schematically illustrating various different mode levels of trust that may exist within a system, and indicates the sealing/unsealing abilities that may be supported in such an arrangement. As shown in FIG. 8, the processing circuitry may be arranged to operate in a secure domain and a less secure domain, and the current mode level of trust may be dependent on which of those security domains the current program code is executed in. In addition, or alternatively, the processing circuitry may be arranged to execute program code in a plurality of different states, and in the example of FIG. 8 may be arranged to operate program code in a privileged state or an unprivileged state. The levels of privilege and the different security domains can be viewed as being orthogonal levels of trust, and a different mode level of trust of the processing circuitry may be associated with each combination of secure/less secure domain and privileged/unprivileged state. Hence, as shown in FIG. 8, there may be four different levels of trust in the example shown.

With regard to the earlier described sealing and unsealing abilities, then, as shown by the arrows in FIG. 8, when the processing circuitry is operating in the secure and privileged mode, it may be able to seal and unseal capabilities whose capability level of trust is associated with any of the other three trust level modes of operation. Also, as shown by the circular arrow, it can also perform sealing and unsealing operations for capabilities whose capability level of trust indicates the secure privileged level of trust.

Similarly, when the processing circuitry is operating in the less secure privileged mode, it may be able to perform sealing and unsealing operations in connection with capabilities associated with the less secure unprivileged level of trust, and again may be able to seal and unseal capabilities associated with its own level of trust as indicated by the circular arrow in FIG. 8. Further, if desired, when the processing circuitry is operating in the secure unprivileged mode, it may be allowed to seal and unseal capabilities associated with the less secure unprivileged level of trust, and again may be able to also seal and unseal capabilities associated with its own level of trust. Finally, in the less secure unprivileged mode, the processing circuitry may only be able to seal and unseal capabilities associated with the less secure unprivileged level of trust.

Whilst FIG. 8 shows four different levels of trust, it will be appreciated that the techniques described herein are not limited to such a configuration, and additional levels of trust, in either or both of the orthogonal directions shown in FIG. 8, may be provided. The privileged and unprivileged modes of operation can take a variety of forms, but purely by way of example the privileged mode may in some implementations be referred to as a handler mode and the unprivileged mode may be referred to as a thread mode. The handler mode is typically used for exception processing, and hence for example a trusted exception handling routine may be executed in the handler mode. The thread mode is typically used for running different threads, for example different application threads.

Figure 9A:
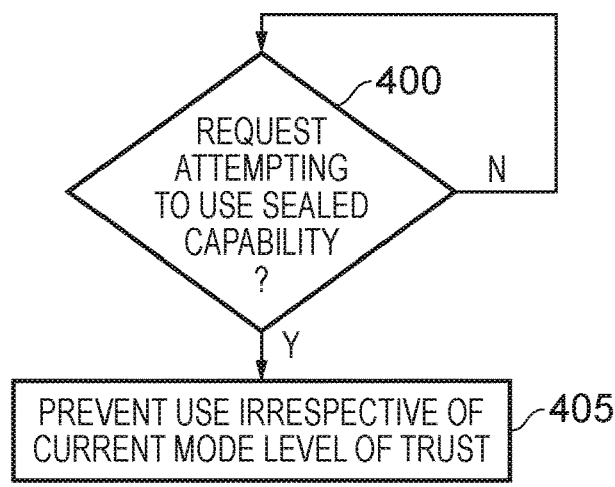
FIGS. 9A and 9B are flow diagrams illustrating different ways in which requests to use a sealed capability may be handled, in accordance with two example implementations.
Figure 9B:
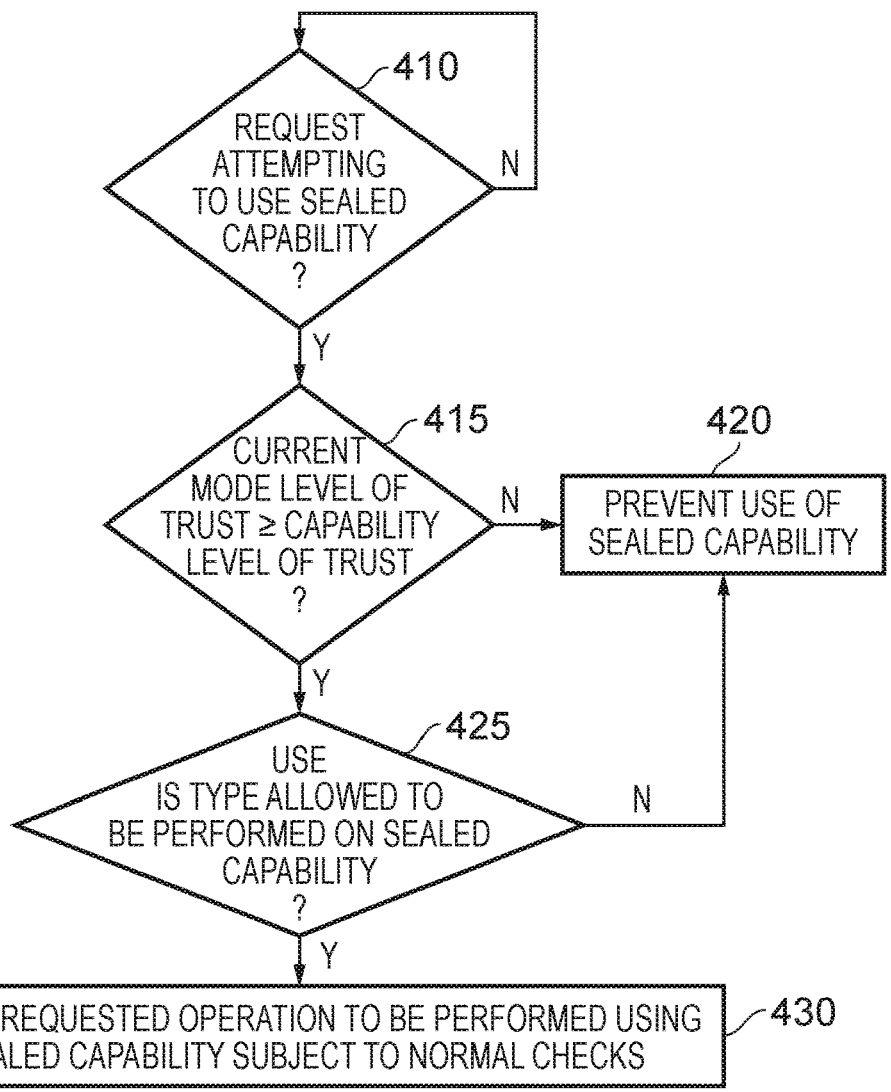

FIGS. 9A and 9B are flow diagrams illustrating different approaches that can be taken when considering the use of sealed capabilities. Firstly, as shown in FIG. 9A, if at step 400 a request is attempted to use a sealed capability, then at step 405 such use may be prevented irrespective of the current mode level of trust, in accordance with one example implementation. In particular, in accordance with the implementation illustrated in FIG. 9A, the system will only allow use of sealed capabilities if they have first been unsealed. Hence, in such an implementation all processing operations that are attempted in respect of a sealed capability will fail. However, it should be noted that the processing circuitry may still be allowed to move sealed capabilities between storage structures, for example between registers and memory, or between different registers. Further, in one example implementation, it may still be possible for a sealed capability to be invalidated, typically by clearing the earlier mentioned tag bit associated with the capability.

FIG. 9B is a flow diagram illustrating an alternative implementation where some use of a sealed capability may be allowed in certain situations. Accordingly, when at step 410 it is determined that a request is attempting to use a sealed capability, it is then determined at step 415 whether the current mode level of trust is greater than or equal to the capability level of trust. If not, use of the sealed capability is prevented at step 420, but otherwise the process proceeds to step 425 where it is determined whether the particular use in question is a type of use that is allowed to be performed on sealed capabilities. If not, then again the use of the sealed capability is prevented at step 420, but otherwise the process proceeds to step 430 where the requested operation is allowed to be performed using the sealed capability, subject to any normal checks that may be performed before allowing the use to proceed.

With regards to the earlier step 425, the use of sealed capabilities could be restricted to particular types of operation. For example, it may be that when the current mode level of trust exceeds, or is the same as, the capability level of trust of a sealed capability, the processing circuitry is allowed to perform dereferencing operations using that sealed capability in order to generate a memory address. This can give rise to some performance benefits, by avoiding the need to unseal the capability before it is used.

Figure 10:
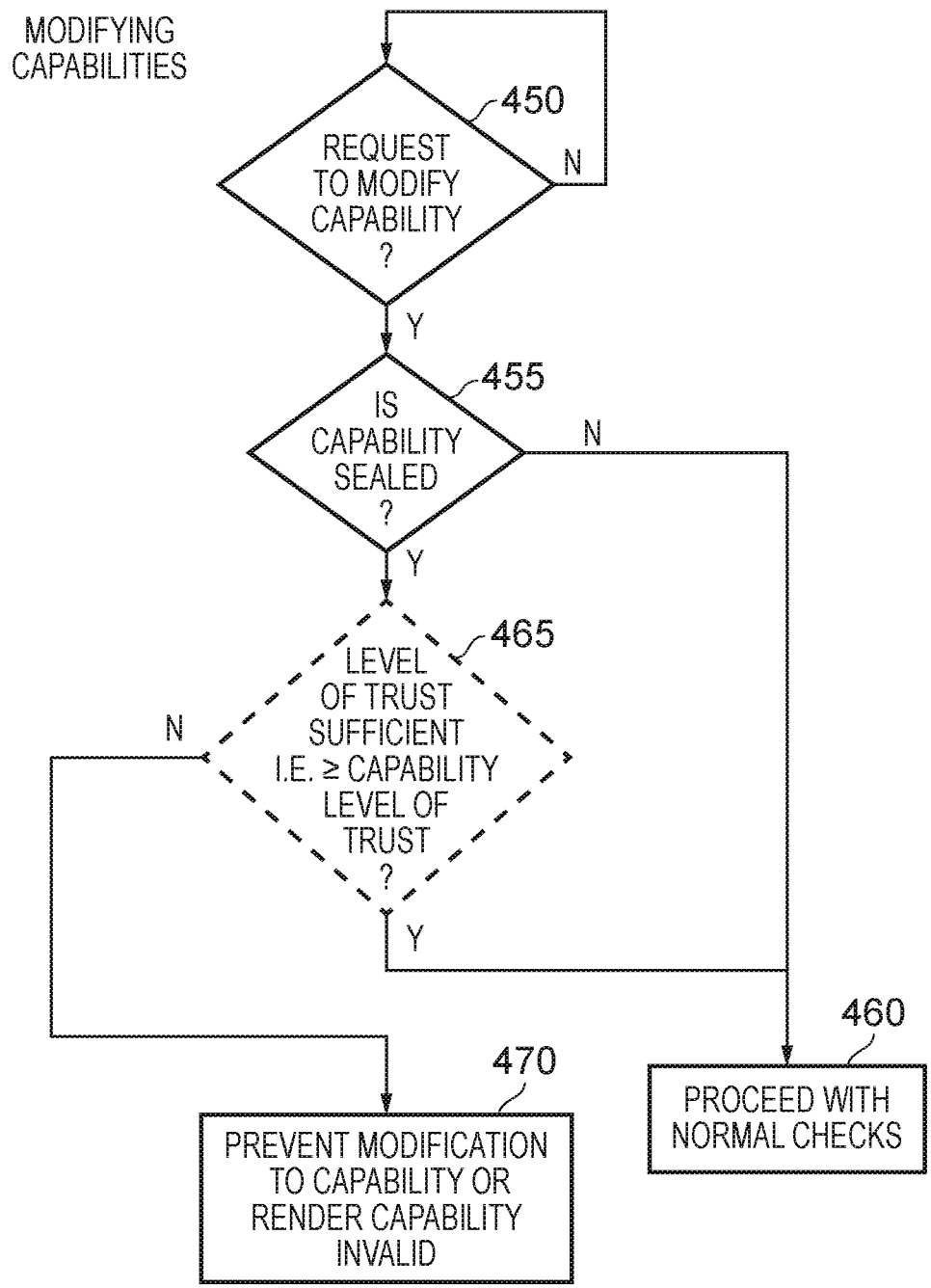
FIG. 10 is a flow diagram illustrating how a request to modify a capability may be handled in accordance with one example implementation.

Another type of processing operation that may be envisaged is modification of a sealed capability, and again this may be supported in certain instances. In particular, FIG. 10 is a flow diagram illustrating the steps that may be performed when handling a request to modify a capability. As indicated in FIG. 10, if at step 450 a request to modify a capability is received, it is determined at step 455 whether the capability is sealed. If not, then the process proceeds to step 460 where the normal checks required in order to determine whether the capability can be modified are performed.

However, if the capability is sealed, then optionally at step 465 it may be determined whether the level of trust associated with the current operating mode of the processing circuitry is sufficient to allow modification of the capability to take place. This could for example be the case if the current mode level of trust is greater than or equal to the capability level of trust. If so, then the process can proceed to the earlier-mentioned step 460 to perform the normal checks. However, if the level of trust is insufficient, the process can instead proceed to step 470 where modification to the capability is prevented, or instead the capability is rendered invalid. In an alternative implementation where the optional step 465 is omitted, then if the capability is sealed the process may proceed directly from step 455 to step 470 to prevent modification to the capability or to render the capability invalid.

In all of the above examples discussed with reference to FIGS. 6 to 10 it is assumed that when the current mode level of trust has been compared with the capability level of trust, the described actions may be permitted whenever the current mode level of trust is greater than or equal to the capability level of trust. In an alternative implementation, the ability to perform those actions may be restricted to situations where the current mode level of trust matches the capability level of trust.

Figure 11:
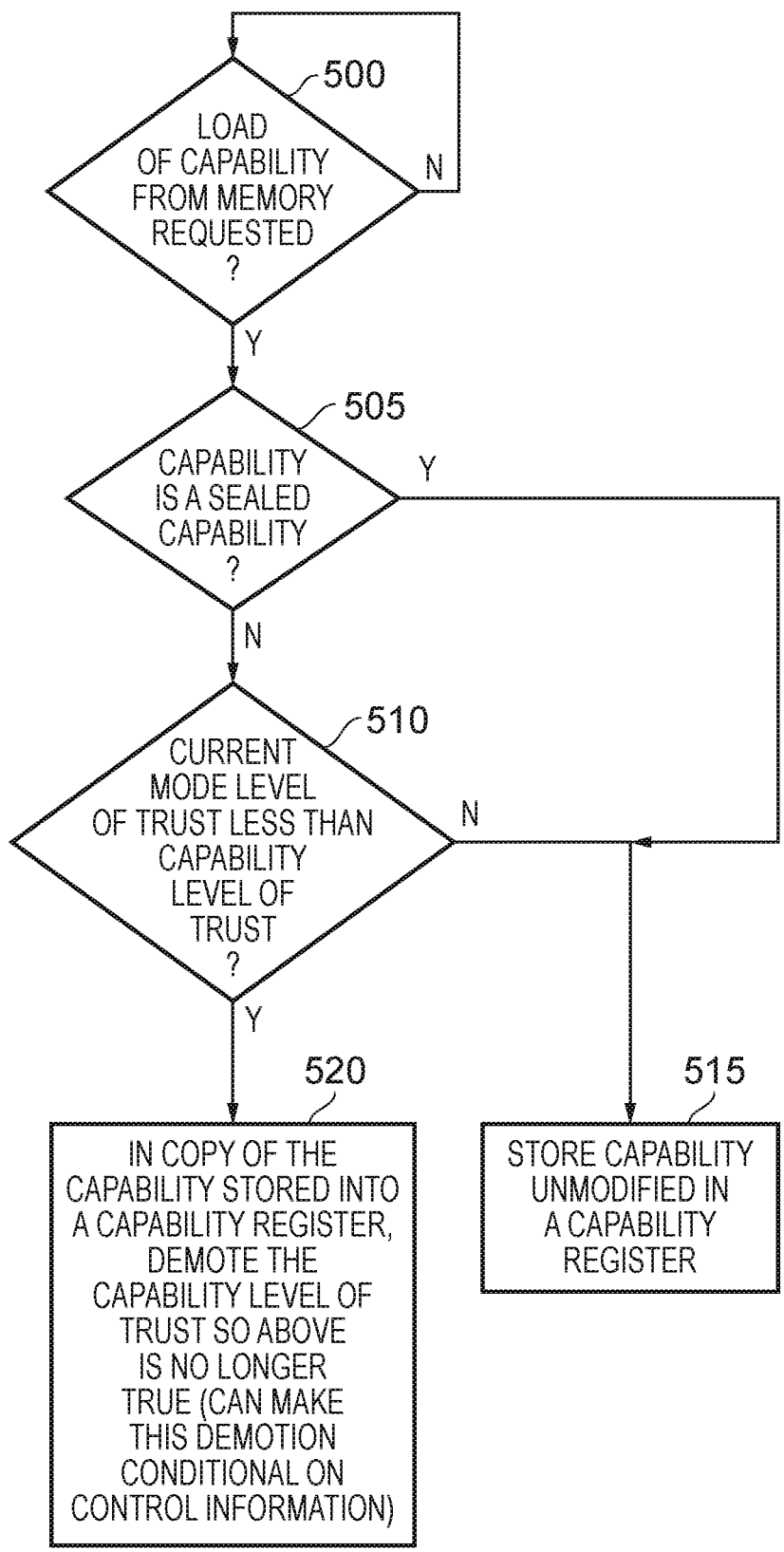
FIG. 11 is a flow diagram illustrating steps performed in order to load a capability from memory, in accordance with one example implementation.

When loading capabilities from memory into one of the capability registers 60, 80, the processing circuitry may be arranged to selectively modify the capability level of trust in certain situations, one example implementation of this approach being shown in FIG. 11. At step 500, it is determined whether a load of a capability from memory is requested. At step 505, it is then determined whether the capability identified for the load operation is a sealed capability. If so, then the process proceeds to step 515, where the capability is stored in unmodified form in the identified capability register for the load operation. In particular, due to the property of sealed capabilities, it would be inappropriate for any change in the capability level of trust to be made during the load operation. Further, due to the earlier described mechanisms employed by the sealed capability handling circuitry 185 in order to control the use of sealed capabilities, security can still be ensured for a sealed capability even though no reduction in the capability level of trust is made when loading the sealed capability into a capability register.

If at step 505 it is determined that the capability is not a sealed capability, then the process proceeds to step 510 where it is determined whether the current mode level of trust is less than the capability level of trust of the capability that is to be loaded from memory. If not, then in one example implementation the process proceeds to step 515 where the capability is stored unmodified within the capability register.

However, in accordance with the technique shown in FIG. 11, if the current mode level of trust is less than the capability level of trust, then the process proceeds to step 520, where the capability level of trust associated with the copy of the capability that is being stored into the capability register is demoted so that the current mode level of trust is no longer less than the capability level of trust. By such an approach, it can be ensured that even if the capability being loaded from memory has a higher associated level of privilege, the resulting capability that is loaded into the processing circuitry's capability register will have its capability level of trust demoted so that it could not be used to access memory that should not be accessed by the processing circuitry when operating with the current mode level of trust. Conversely, if the capability in memory has a lower level of trust than the current mode level of trust, its level of trust stays "as is" as it is moved into the capability register. This can avoid accidental promotion of capabilities, for example avoiding the case of an exception handler accidentally promoting stacked values.

In one example implementation it is possible for the capability loading process to be used in certain situations to load general purpose data into a capability register rather than a capability. This can be detected at step 500, and if in fact the load operation is being used to load general purpose data, then the selective demotion of the bits that would specify the capability level of trust within a capability can be prevented, thus avoiding corruption of the data being loaded.

As indicated by step 520 in FIG. 11, the ability to selectively demote capability levels of trust can be made configurable, for example by making it conditional on control information stored within the control registers 90. The selective demotion of capabilities could also be disabled for certain types of capabilities (in addition to the sealed capabilities already mentioned above), and hence for example could be disabled when the capability being loaded is an immutable capability. Such an ability could be beneficial, for example to allow the spilling of privileged immutable capabilities from within an unprivileged mode of operation without modifying the immutable capability. Further, whilst as mentioned above the control information used to conditionally enable or disable the selective demotion of capabilities being loaded from memory can be stored in the control registers, that control information could also be stored elsewhere, for example as a field within the capability itself, or so as to enable demotion to be based, for example, on MPU region attributes. With this latter approach, the mechanism could be arranged so that if a capability is loaded from an MPU region marked as read-only (e.g. code memory) the demotion would occur, but would not occur if the relevant region is marked as read-write (e.g. a heap or stack memory). In some implementations a dedicated control bit in the MPU could be used to dictate the behaviour.

Figure 12:
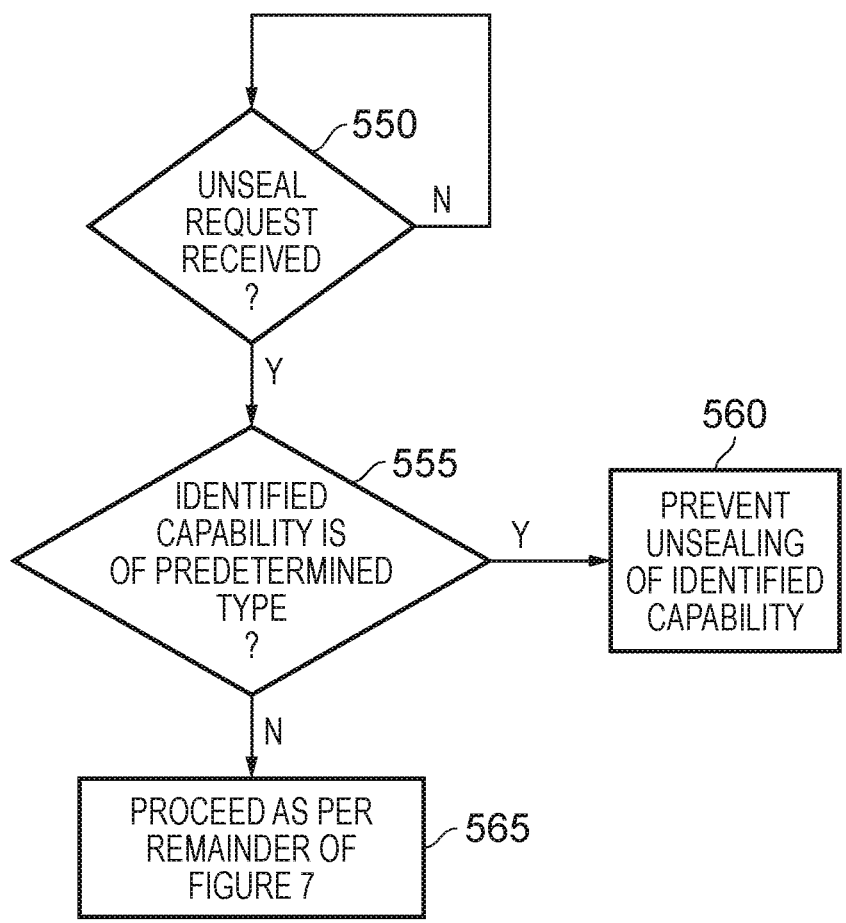
FIG. 12 is a flow diagram illustrating how an unseal request may be handled dependent on whether the capability is of a predetermined type or not, in accordance with one example implementation.

FIG. 12 is a flow diagram illustrating how the unsealing of capabilities can be selectively inhibited for certain predetermined types of capabilities. In particular, when an unseal request is received at step 550, it is determined at step 555 whether the identified capability is of a predetermined type. If not, then at step 565 the process proceeds as per the remainder of FIG. 7 discussed earlier. However, if at step 555 the identified capability is of a predetermined type, then the process proceeds to step 560 where the unsealing of the identified capability is prevented. As mentioned earlier when discussing step 360 of FIG. 7, various information can be output if desired to identify that the unsealing of the identified capability has not taken place, and could in this instance for example flag that an attempt has been made to unseal a capability of the predetermined type, or assert an error. As another option, or in addition, the tag bit could be cleared to invalidate the capability.

The predetermined types of capabilities for which the above process could be employed can take a variety of forms, but for example may be one or more types of capabilities that are used by the architecture to indicate specific events or functions. There are a number of ways in which such reserved type capabilities may be identified. As a particular example, they may have range bounds information that defines an invalid range, for example by the upper bound being below the lower bound.

If desired, in addition to the sealed flag discussed earlier, a capability can be provided with one or more extra fields to provide additional indications used to identify specific purposes for which that capability can be used. In addition, if desired, the address value encoded in the capability may not directly identify a memory address, but rather may provide an indirection that allows software to validate against its own records.

Figure 13:
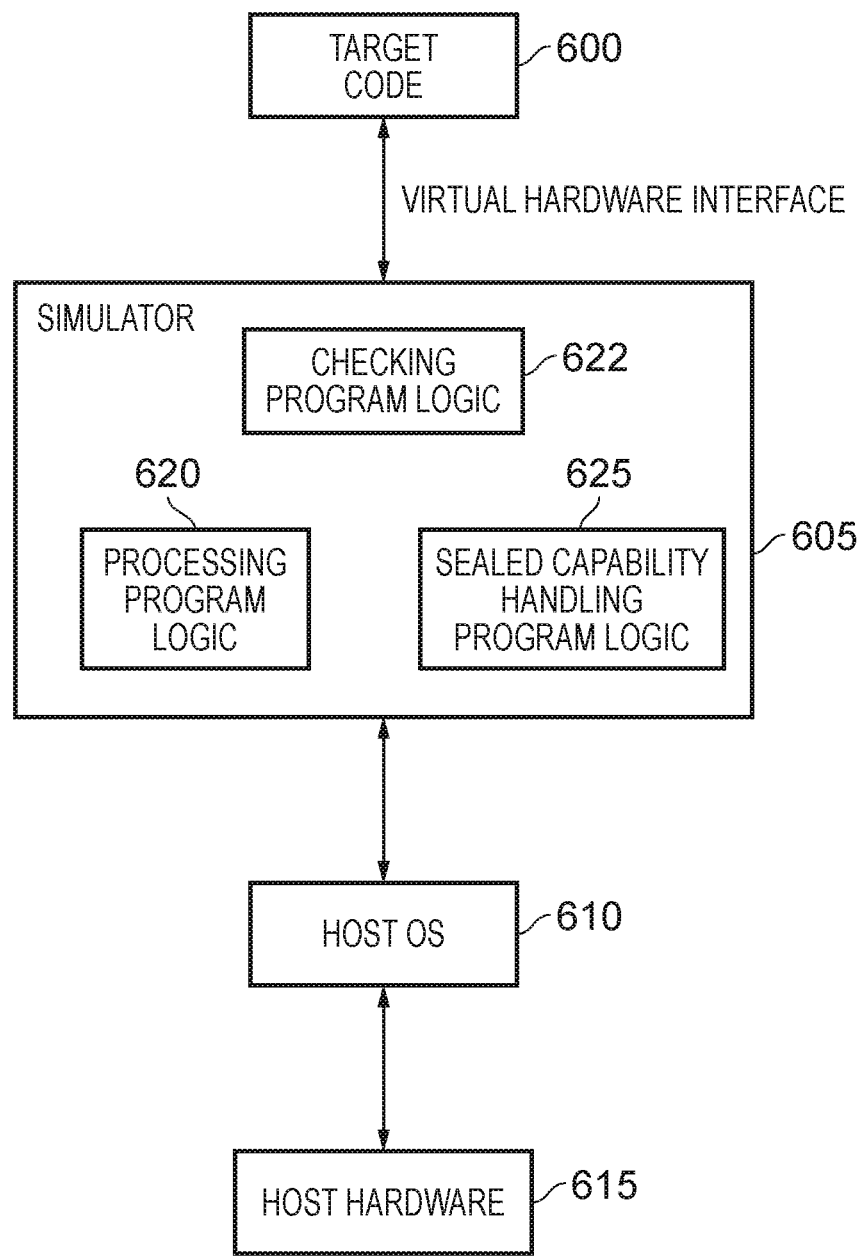
FIG. 13 shows a simulator example that can be used.

FIG. 13 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically a simulator implementation may run on a host processor 615, optionally running a host operating system 610, supporting the simulator program 605. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 50 in the hardware apparatus 2 could be emulated as a simulated address space which is mapped on to the virtual address space used by the host operating system 610 by the simulator 605. In arrangements where one or more of the hardware elements referenced in the previously described examples are present on the host hardware (for example host processor 615), some simulated implementations may make use of the host hardware, where suitable.

The simulator program 605 may be stored on a computer readable storage medium (which may be a non-transitory medium), and provides a virtual hardware interface (instruction execution environment) to the target code 600 (which may include applications, operating systems and a hypervisor) which is the same as the hardware interface of the hardware architecture being modelled by the simulator program 605. Thus, the program instructions of the target code 600 may be executed from within the instruction execution environment using the simulator program 605, so that a host computer 615 which does not actually have the hardware features of the apparatus 2 discussed above can emulate those features. The simulator program may include processing program logic 620 to emulate the behaviour of the processing pipeline 4, checking program logic 622 to emulate the behaviour of the capability checking circuitry 33 and the memory access checking circuitry 52 of the hardware apparatus 2 of FIG. 1, and sealed capability handling program logic 605 to emulate the behaviour of the sealed capability handling circuitry 185. Hence, the techniques described herein for managing capabilities and their associated capability levels of trust, along with the described techniques for handling sealed capabilities, can in the example of FIG. 13 be performed in software by the simulator program 605.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform processing operations during which access requests to memory are generated, wherein the processing circuitry is arranged to generate memory addresses for the access requests using capabilities that identify constraining information; and
checking circuitry to determine whether a given access request whose memory address is generated using a given capability is permitted based on the constraining information identified by that given capability, and based on a level of trust associated with the given access request;
wherein:
each capability has a capability level of trust associated therewith, and the level of trust associated with the given access request is dependent on both a current mode level of trust associated with a current mode of operation of the processing circuitry, and the capability level of trust of the given capability;
at least one of the capabilities is settable as a sealed capability; and
the apparatus further comprises sealed capability handling circuitry to prevent the processing circuitry performing at least one processing operation using a given sealed capability when the current mode level of trust is a lower level of trust than the capability level of trust of the given sealed capability.

2. The apparatus as claimed in claim 1, wherein:
each capability has a sealed flag associated therewith, and
the sealed capability handling circuitry is responsive to a seal request for a chosen capability to determine whether to set the sealed flag of the chosen capability to identify the chosen capability as a sealed capability, dependent on a comparison of the capability level of trust of the chosen capability with the current mode level of trust.

3. The apparatus as claimed in claim 2, wherein the sealed capability handling circuitry is arranged, in response to the seal request, to inhibit setting the sealed flag when the capability level of trust of the chosen capability is greater than the current mode level of trust.

4. The apparatus as claimed in claim 3, wherein the sealed capability handling circuitry is arranged, in response to the seal request, to set the sealed flag when the capability level of trust of the chosen capability matches the current mode level of trust.

5. The apparatus as claimed in claim 1, wherein each capability has a sealed flag associated therewith that is settable to indicate that capability as a sealed capability, and the sealed capability handling circuitry is responsive to an unseal request for a chosen sealed capability to inhibit clearing of the sealed flag of the chosen sealed capability when the capability level of trust of the chosen sealed capability is greater than the current mode level of trust.

6. The apparatus as claimed in claim 5, wherein the sealed capability handling circuitry is arranged, in response to the unseal request, to clear the sealed flag when the capability level of trust of the chosen sealed capability matches the current mode level of trust.

7. The apparatus as claimed in claim 1, wherein the sealed capability handling circuitry is arranged, when the current mode level of trust is a lower level of trust than the capability level of trust of the given sealed capability, to prevent the processing circuitry performing any of a plurality of processing operations using the given sealed capability, but to allow moving of the given sealed capability between storage elements.

8. The apparatus as claimed in claim 1, wherein the sealed capability handling circuitry is arranged to require the given sealed capability to be unsealed before that capability is allowed to be used by the processing circuitry in subsequent processing operations, irrespective of the current mode level of trust.

9. The apparatus as claimed in claim 1, wherein the sealed capability handling circuitry is arranged, at least when the current mode level of trust is the same as the capability level of trust of the given sealed capability, to allow the processing circuitry to perform one or more processing operations using the given sealed capability without unsealing the given sealed capability.

10. The apparatus as claimed in claim 9, wherein the sealed capability handling circuitry is arranged to allow the one or more processing operations to be performed using the given sealed capability, provided the current mode level of trust is the same as, or greater than, the capability level of trust of the given sealed capability.

11. The apparatus as claimed in claim 9, wherein the one or more processing operations allowed to be performed comprises at least one of: a dereferencing operation to generate a memory address using the given sealed capability; and/or a capability modifying operation to modify information identified by the given sealed capability.

12. The apparatus as claimed in claim 1, wherein:
the processing circuitry is arranged to execute program code in one of a plurality of states comprising at least a privileged state and an unprivileged state, and
the current mode level of trust is dependent on which of the plurality of states the current program code is executed in.

13. The apparatus as claimed in claim 1, wherein;
the processing circuitry is arranged to execute program code in one of a plurality of security domains comprising at least a secure domain and a less secure domain, and
the current mode level of trust is dependent on which of the plurality of security domains the current program code is executed in.

14. The apparatus as claimed in claim 1, further comprising: a set of capability registers; and memory circuitry to store one or more capabilities;
wherein:
the processing circuitry is arranged to perform a load operation to load a chosen capability from the memory circuitry into a selected capability register from the set of capability registers in which capabilities are stored for reference by the processing circuitry; and
the processing circuitry is arranged, during the load operation, to selectively modify the capability level of trust such that the chosen capability as stored into the selected capability register has a capability level of trust constrained not to exceed the current mode level of trust or the capability level of trust of the chosen capability as stored in the memory circuitry; and
the processing circuitry is further arranged, when the chosen capability is a sealed capability, to inhibit modification of the capability level of trust during the load operation.

15. The apparatus as claimed in claim 1, wherein:
each capability has a sealed flag associated therewith that is settable to indicate that capability as a sealed capability, and the sealed capability handling circuitry is responsive to an unseal request for a chosen sealed capability to inhibit clearing of the sealed flag of the chosen sealed capability when the capability level of trust of the chosen sealed capability is greater than the current mode level of trust; and the sealed capability handling circuitry is arranged to generate outcome information indicative of an outcome of processing the unseal request for the chosen sealed capability.

16. The apparatus as claimed in claim 15, wherein the sealed capability handling circuitry is arranged to generate the outcome information by setting one or more status flags accessible to the processing circuitry.

17. The apparatus as claimed in claim 1, wherein the sealed capability handling circuitry is arranged to inhibit unsealing of at least one predetermined type of capability irrespective of the current mode level of trust.

18. The apparatus as claimed in claim 1, wherein the level of trust associated with the given access request is constrained to be whichever of the current mode level of trust and the capability level of trust represents a lower level of trust.

19. A method of handling sealed capabilities, comprising:
employing processing circuitry to perform processing operations during which access requests to memory are generated, wherein the processing circuitry generates memory addresses for the access requests using capabilities that identify constraining information; and employing checking circuitry to perform determining whether a given access request whose memory address is generated using a given capability is permitted based on the constraining information identified by that given capability, and based on a level of trust associated with the given access request;

wherein:
each capability has a capability level of trust associated therewith, and the level of trust associated with the given access request is dependent on both a current mode level of trust associated with a current mode of operation of the processing circuitry, and the capability level of trust of the given capability; and at least one of the capabilities is settable as a sealed capability; and the method further comprises employing sealed capability handling circuitry to prevent the processing circuitry performing at least one processing operation using a given sealed capability when the current mode level of trust is a lower level of trust than the capability level of trust of the given sealed capability.

20. A non-transitory computer-readable storage medium storing a computer program for controlling a host data processing apparatus to provide an instruction execution environment, comprising:

processing program logic to perform processing operations during which access requests to memory are generated, wherein the processing program logic is arranged to generate memory addresses for the access requests using capabilities that identify constraining information; and checking program logic to determine whether a given access request whose memory address is generated using a given capability is permitted based on the constraining information identified by that given capability, and based on a level of trust associated with the given access request;

wherein:
each capability has a capability level of trust associated therewith, and the level of trust associated with the given access request is dependent on both a current mode level of trust associated with a current mode of operation of the processing program logic, and the capability level of trust of the given capability;

at least one of the capabilities is settable as a sealed capability; and the apparatus further comprises sealed capability handling program logic to prevent the processing program logic performing at least one processing operation using a given sealed capability when the current mode level of trust is a lower level of trust than the capability level of trust of the given sealed capability.

* * * * *